US012050704B2

(12) United States Patent
Saxena et al.

(10) Patent No.: US 12,050,704 B2
(45) Date of Patent: Jul. 30, 2024

(54) SECURE DATA CONTENT ACCESS SYSTEM AND METHOD

(71) Applicant: Western Digital Technologies, Inc., San Jose, CA (US)

(72) Inventors: Vishwas Saxena, Bengaluru (IN); Mukesh Kumar, Bengaluru (IN)

(73) Assignee: Western Digital Technologies, Inc., San Jose, CA (US)

( * ) Notice: Subject to any disclaimer, the term of this patent is extended or adjusted under 35 U.S.C. 154(b) by 268 days.

(21) Appl. No.: 17/556,935

(22) Filed: Dec. 20, 2021

(65) Prior Publication Data

US 2023/0195912 A1    Jun. 22, 2023

(51) Int. Cl.
*G06F 21/62* (2013.01)
*G06F 12/14* (2006.01)
*H04L 9/32* (2006.01)

(52) U.S. Cl.
CPC .......... *G06F 21/62* (2013.01); *G06F 12/1458* (2013.01); *H04L 9/3263* (2013.01)

(58) Field of Classification Search
CPC ... G06F 21/62; G06F 12/1458; H04L 9/3263; H04L 63/062; H04L 63/10; H04W 12/122
See application file for complete search history.

(56) References Cited

U.S. PATENT DOCUMENTS 9,100,186 B2 * 8/2015 O'Hare ............... G06F 21/6218
2011/0154022 A1 * 6/2011 Cheng .................. H04L 63/062
713/153
2017/0289800 A1 * 10/2017 Frusina ............... H04L 63/0876
2019/0281449 A1    9/2019 Luo
2019/0394042 A1 * 12/2019 Peddada ............... H04L 9/0894
2020/0007531 A1 *  1/2020 Koottayi .............. H04L 67/146
(Continued)

OTHER PUBLICATIONS

Zhang et al., "Authorized Data Secure Access Scheme With Specified Time and Relevance Ranked Keyword Search for Industrial Cloud Platforms," IEEE Systems Journal Year: 2022 | vol. 16, Issue: 2 | Journal Article | Publisher: IEEE.*

(Continued)

*Primary Examiner* — Roderick Tolentino
(74) *Attorney, Agent, or Firm* — Patent Law Works LLP

(57) ABSTRACT

A method for securing access to a data storage device (DSD), comprising: receiving, from a host connected to a data port of the DSD, a data access request to access user data stored on the DSD. In response to receiving the data access request, the DSD transmits, to the host, a Long Term Device Key (LTDK) of the DSD and a session identifier uniquely generated for the data access session. An access token is received from the host, signed by a private Long Term Host Key (LTHK) of the host. The LTHK and the LTDK form a cryptographic pair. The access token is validated using the LTDK to determine whether the host is authorized to access the DSD. In response to determining that the host is authorized to access the DSD, a data access state of the DSD is set to an unlocked state to enable access to the user data by the host via the data port, wherein the LTDK is obtained from a registration token transmitted to the DSD by the host. The registration token is secured by a registration server in response to the registration of the host with the DSD.

20 Claims, 11 Drawing Sheets

(56) References Cited

U.S. PATENT DOCUMENTS

2020/0110892 A1* 4/2020 Ramakrishnappa .... G06F 21/78
2020/0403780 A1* 12/2020 Ståhl ..................... H04L 63/062
2022/0075887 A1* 3/2022 Wu ......................... G06F 21/44
2022/0239491 A1* 7/2022 Sugarev ................ H04L 63/126
2022/0417024 A1* 12/2022 Yee ....................... G06F 3/0622

OTHER PUBLICATIONS

Yang et al., "Research on Dynamic Access Control Mechanism Based on Short-term Token and User Trust," 2022 International Conference on Blockchain Technology and Information Security (ICBCTIS) Year: 2022 | Conference Paper | Publisher: IEEE.*
A Detailed Look at RFC 8446 (a.k.a. TLS 1.3). Cloudflare article available from https://blog.cloudflare.com/rfc-8446-aka-tls-1-3/.
Whitfield Diffie and Martin E Hellman, "New Directions in Cryptography", IEEE Transactions on Information Theory vol. IT-22 No. 6, Nov. 1976.
Karim Lounis, Mohammad Zulkernine. Bluetooth Low Energy Makes "Just Works" Not Work. Cyber Security in Networking Conference, Oct. 2019, Quito, Ecuador. hal-02528877.

* cited by examiner

SECURE DATA CONTENT ACCESS SYSTEM AND METHOD

TECHNICAL FIELD

This disclosure relates to a system and method for providing secure access to data content of a data storage device, such as for example a flash drive, to a host computer system.

BACKGROUND

Data storage devices (DSDs) are electronic devices with the capability to store information in the form of digital data. DSDs are typically deployed as an integrated part of, or as a removable component configured to interface with, a computing system for the purpose of improving the data transmission and storage capabilities of the system. From the perspective of the computing system, a DSD is typically implemented as a block storage device where the data stored is in the form of one or more blocks, being sequences of bytes or bits having a maximum length, referred to as block size.

External DSDs are commonly used to supplement the data storage capabilities of a computer system. For example, external DSDs are often standalone physical devices which house an internal storage component, such as a hard disk drive (HDD) or a solid state drive (SSD), that provides a host computing system with an additional portion of non-volatile memory (i.e., the volume of the drive) in which to store digital data. These external drive type devices are connectable to the host computer system via a data path operating over a particular connectivity protocol (e.g., via Universal Serial Bus (USB) cable). In response to being connected to the host computer system, the host computer system recognizes the external drive as a block data storage device such that a user of the device may access the storage of the drive via the data path (e.g., through operation of the host computer). Access to the drive typically enables a user to access (e.g., read, write and/or modify) user data stored on the drive.

Small-scale portable data storage devices, such as flash drives, have become ubiquitous due to the ever increasing need for personal and portable data storage solutions. As a consequence of the increased adoption of such devices as a means to store personal data content ("user content data"), such as documents, media, and the like, attackers are provided with a greater opportunity to gain unauthorized access to a user's data by executing attacks against flash drive and similar devices. It is therefore desired to secure the user data of such a data storage device against access by unauthorized parties.

SUMMARY

Disclosed herein is a method for securing access to a data storage device (DSD), comprising: receiving, from a host connected to a data port of the DSD, a data access request to access user data stored on a non-volatile storage medium of the DSD; in response to receiving the data access request, transmitting an acknowledgement to the host, the acknowledgement including: a Long Term Device Key (LTDK) of the DSD; and a session identifier uniquely generated by the DSD for the data access session of the host; receiving, from the host, an access token signed by a private Long Term Host Key (LTHK) of the host, the LTHK of the host and the LTDK of the DSD forming a cryptographic Long Term Key pair; validating the access token using the LTDK of the DSD to determine whether the host is authorized to access the DSD; and in response to determining that the host is authorized to access the DSD, selectively setting a data access state of the DSD to an unlocked state to enable access to the user data by the host via the data port, wherein the LTDK is obtained from a registration token transmitted to the DSD by the host, the registration token being secured by a registration server in response to the registration of the host with the DSD.

In some embodiments, the registration token is cryptographically secured by a registration server key pair associated with the registration server, the registration server key pair including: a private server key used by the registration server to cryptographically sign the registration token and a public server key used by the DSD to verify the received signed registration token.

In some embodiments, the public server key is stored in a non-volatile memory of the device prior to the device receiving the registration token.

In some embodiments, the method further comprises transmitting, to the host, user device information including at least an identification key (IDK) of the DSD, wherein the user device information is provided to the registration server by the host as a request to register the host as authorized to access the DSD; and in response to the registration server verifying, using the IDK of the DSD, that no host is registered as being authorized to access the DSD, receiving from the registration server, via the host, the signed registration token including the LTDK, wherein the LTDK and the LTHK are generated by the registration server, and wherein the LTHK is transmitted from the registration server to the host.

In some embodiments, the method further comprises transmitting, to the host, user device information including at least an identification key (IDK) of the DSD, wherein the user device information is provided to the registration server by the host as a request to register the host as authorized to access the DSD, the user device information including the LTDK; and in response to the registration server verifying that no host is registered as being authorized to access the DSD, receiving from the registration server, via the host, the signed registration token including the LTDK, wherein the LTDK and the LTHK are generated by the host.

In some embodiments, the access token is generated by the host and includes, at least a representation of the session identifier of the acknowledgement received from the DSD.

In some embodiments, the access token is an access certificate with a digest including at least: the representation of the session identifier; and the LTDK of the acknowledgement received from the DSD.

In some embodiments, in response to selectively setting the data access state to the unlocked state, the DSD is configured to generate a physical enable signal to enable transmission of user data between the host and the storage medium via the data port.

In some embodiments, the method further comprises receiving, from a secondary host connected to the data port of the DSD, a secondary data access request to access user data stored on a non-volatile storage medium of the DSD; in response to receiving the secondary data access request, transmitting a secondary acknowledgement to the secondary host, the secondary acknowledgement including at least: the LTDK of the DSD; and a second session identifier being uniquely generated by the DSD for the data access session of the secondary host; receiving, from the secondary host, a secondary access token signed by the LTHK of the host; validating the secondary access token to determine the secondary host as authorized to access the DSD; and in response to determining the secondary host as authorized to access the DSD, electively setting a data access state of the DSD to at least an unlocked state to enable access to the user data by the host via the data port, wherein the secondary access token is transmitted to the secondary host by the registration server, in response to the host providing authorization for the secondary host to access the user data of the DSD.

In some embodiments, the secondary access token is either: an access certificate generated by the registration server; or a digital signature generated by the host, the access token including the second session identifier, and the access token being generated in response to the host providing authorization for the secondary host to access the user data of the DSD.

Also disclosed herein is a data storage device (DSD), comprising: a non-volatile storage medium configured to store user data; a controller coupled to the storage medium and the communications module via a data path, the controller configured to: receive, from a host connected to a data port of the DSD, a data access request to access user data stored on a non-volatile storage medium of the DSD; in response to receiving the data access request, transmit an acknowledgement to the host, the acknowledgement including: a Long Term Device Key (LTDK) of the DSD; and a session identifier uniquely generated by the DSD for the data access session of the host; receive, from the host, an access token signed by a private Long Term Host Key (LTHK) of the host, the LTHK of the host and the LTDK of the DSD forming a cryptographic Long Term Key pair; validate the access token using the LTDK of the DSD to determine whether the host is authorized to access the DSD; and in response to determining that the host is authorized to access the DSD, selectively set a data access state of the DSD to an unlocked state to enable access to the user data by the host via the data port, wherein the LTDK is obtained from a registration token transmitted to the DSD by the host, the registration token being secured by a registration server in response to the registration of the host with the DSD.

In some embodiments, the controller is further configured to: transmit, to the host, user device information including at least an identification key (IDK) of the DSD, wherein the user device information is provided to the registration server by the host as a request to register the host as authorized to access the DSD; and in response to the registration server verifying, using the IDK of the DSD, that no host is registered as being authorized to access the DSD, receive from the registration server, via the host, the signed registration token including the LTDK, wherein the LTDK and the LTHK are generated by the registration server, and wherein the LTHK is transmitted from the registration server to the host.

In some embodiments, the controller is further configured to: transmit, to the host, user device information including at least an identification key (IDK) of the DSD, wherein the user device information is provided to the registration server by the host as a request to register the host as authorized to access the DSD, the user device information including the LTDK; and in response to the registration server verifying, using the IDK of the DSD, that no host is registered as being authorized to access the DSD, receive from the registration server, via the host, the signed registration token including the LTDK, wherein the LTDK, and the LTHK are generated by the host.

In some embodiments, the access token is generated by the host and includes, at least a representation of the session identifier of the acknowledgement received from the DSD.

In some embodiments, in response to selectively setting the data access state to the unlocked state, the controller is further configured to generate a physical enable signal to enable transmission of user data between the host and the storage medium via the data port.

In some embodiments, the controller is further configured to: receive, from a secondary host connected to the data port of the DSD, a secondary data access request to access user data stored on a non-volatile storage medium of the DSD; in response to receiving the secondary data access request, transmit a secondary acknowledgement to the secondary host, the secondary acknowledgement including at least a second session identifier being uniquely generated by the DSD for the data access session of the secondary host; receive, from the secondary host, a secondary access token signed by the LTHK of the host; validate the secondary access token to determine the secondary host as authorized to access the DSD; and in response to determining the secondary host as authorized to access the DSD, selectively set a data access state of the DSD to an unlocked state to enable access to the user data by the host via the data port, wherein the secondary access token is transmitted to the secondary host by the registration server, in response to the host providing authorization for the secondary host to access the user data of the DSD.

Also disclosed herein is a host configured for secure data access with a data storage device (DSD), the host comprising: means for transmitting, to the device, a secure data access request for accessing user data stored on a non-volatile storage medium of the DSD; means for receiving, from the DSD, an acknowledgement including: a Long Term Device Key (LTDK) of the DSD; and a session identifier uniquely generated by the DSD for the data access session of the host; means for generating an access token signed by a private Long Term Host Key (LTHK) of the host, where the LTHK of the host and the LTDK of the DSD form a cryptographic Long Term Key pair; and means for transmitting the access token to the DSD to validate the access token using the LTDK of the DSD, wherein, in response to the DSD determining that the host is authorized to access the DSD, the DSD selectively sets a data access state of the DSD to an unlocked state to enable access to the user data by the host via the data port, wherein the LTDK is obtained from a registration token transmitted to the DSD by the host, the registration token being secured by a registration server in response to the registration of the host with the DSD.

In some embodiments, the host further comprises means for receiving, from the DSD user device information including at least an identification key (IDK) of the DSD; means for transmitting the user device information to the registration server as a request to register the host as authorized to access the DSD, wherein in response to the registration server verifying, using the IDK of the DSD, that no host is registered as being authorized to access the DSD, means for receiving, from the registration server, the signed registration token; means for transmitting the signed registration token to the device, wherein the signed registration token includes the LTDK; and means for receiving the corresponding LTHK.

BRIEF DESCRIPTION OF DRAWINGS

Some embodiments are described herein below with reference to the accompanying drawings, wherein.

DESCRIPTION OF EMBODIMENTS

Figure 1A:
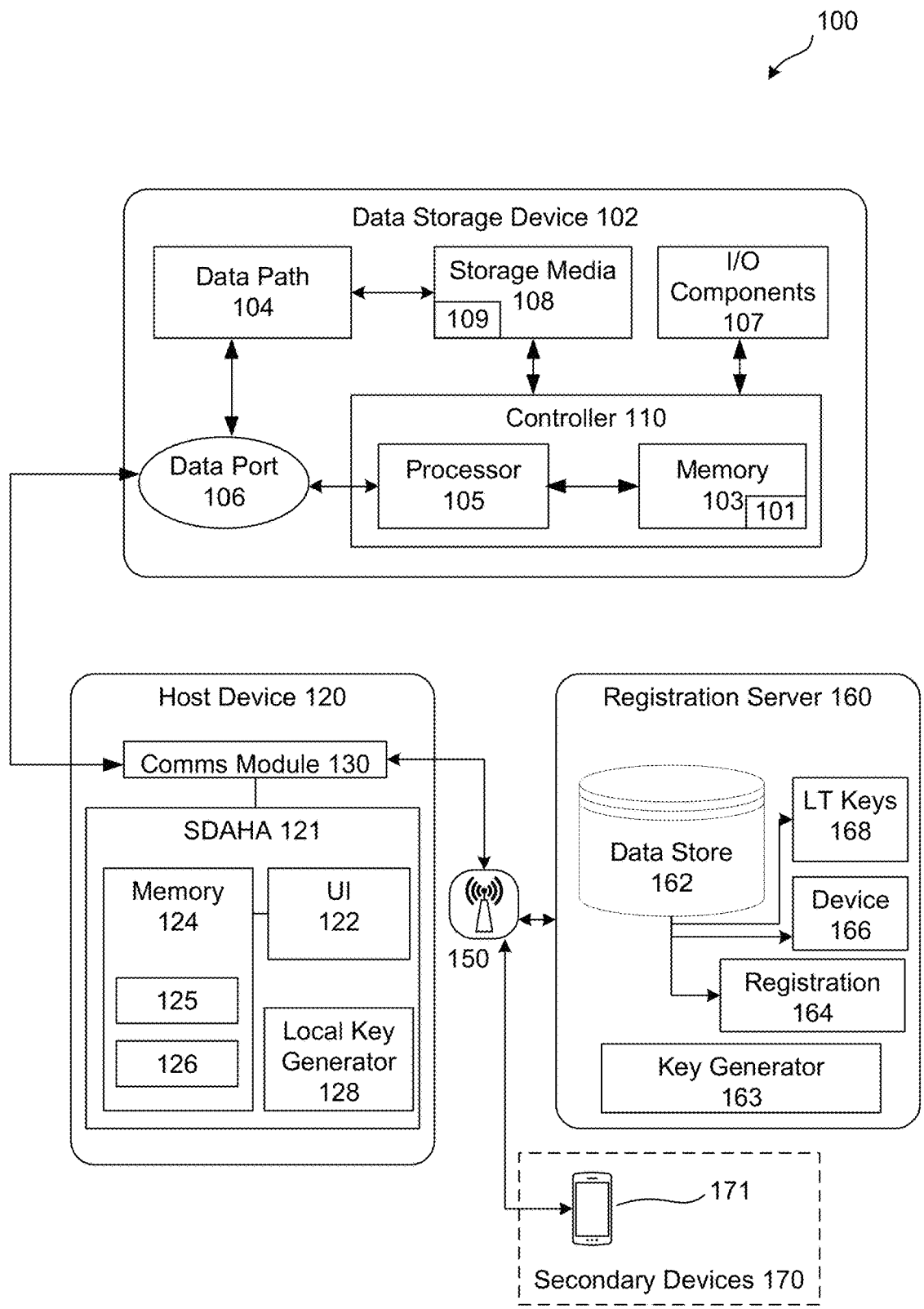
FIG. 1a illustrates an exemplary secure data content access system (SDCAS) according to one embodiment.

Securing the user data of a data storage device involves the use of: a protection mechanism, by which the user data is protected from access by an unauthorized individual; and an authentication mechanism, which is used to determine whether a particular individual is authorized or unauthorized to access the data (and thereby whether the data should be protected from that individual).

One way in which user data of a data storage device (DSD) may be protected is by logically obscuring the data as it is stored on, or retrieved from, the DSD (e.g., using an encryption function). However, implementing an on-device encryption mechanism (referred to as data-at-rest encryption) is not practical for some DSDs due to the associated cost, physical chip space, and/or computational requirements.

Another approach is to physically disable any exchange of data between the internal storage medium of the DSD and an external device connected to the DSD (e.g., a host computer system), such as by a refusal of the DSD to respond to any commands or data requests received from the connected device. That is, the connected device is physically unable to extract user data stored on the internal drive of the DSD, or to write data to the drive. Some DSDs may implement both logical and physical protection mechanisms to secure access to stored user data.

The use of either or both of the aforementioned approaches to protecting user content data may be referred to as placing the DSD into a "locked" data access state, in which the DSD secures user data by preventing (or "disabling") access to the data (i.e., either physically or logically). The DSD provides (or "enables") access to the stored user data when in a corresponding "unlocked" data access state, such that the DSD enables data transmission through the data path, and/or performs decryption of the user data if required, such that the user may access (e.g., read, write and/or modify) user data stored on the drive.

Irrespective of the locking and unlocking functions of the DSD, an effective authentication mechanism to enable the security of data access of a DSD. Password based authentication is commonly used for authorizing a trusted user to access the contents of a DSD, particularly a flash drive. These methods involve the inputting, by the user, of a unique identifier (such as an alphabetic and/or numerical character string, or Personal Identification Number (PIN)) that is then checked against known credentials of the authorized users.

However, password based authentication is vulnerable to brute force attacks in which the attacker repeatedly supplies trial credentials to the device until the unique identifier is eventually reached resulting in the attacker gaining access to the device. The ease of performing such an attack is increased by the nature of flash DSDs as highly portable self-contained devices.

Furthermore, password based authentication does not provide a secure means of secondary user access to a protected device. That is, for DSDs in which the designated password is not easily changeable, sharing the password with another user compromises the security of the device if it is desired to later revoke the implied authorization from the other user.

Other methods that may be used to authenticate users of a DSD include one-time passwords (OTPs), biometric credentials (e.g., fingerprinting), and hardware tokens. However, these approaches also have drawbacks. For example, even though OTPs and biometric credentials may provide improved resistance against brute force type attacks, the ability to provide secondary user access remains an issue. Furthermore, flash DSDs require a data access control solution that is low cost and low complexity due to the physical limitations of these devices. It is desired to develop systems, products, and methods that address one or more of these problems, or that at least provide a useful alternative.

Overview

With reference to FIG. 1a, described herein are embodiments of systems and methods for secure access to data content of a user device (e.g., a data storage device (DSD) as described herein below) 102 by a host computing system 120. DSD 102 and host 120 are configured to connect, via a data port 106, to enable the transfer of user data 109 to and from a storage media 108 of the DSD 102. Specifically, access to the user data 109 of the DSD 102 is securely provided to the host 120 via: (i) registration of the DSD 102 in association with the host 120 to enable secure verification of the identity of the host; and (ii) in response to securely verifying the host, dynamically setting a data access state of the DSD 102 to an unlocked state to enable access to the user data 109 by the host 120 via the data port 106.

Registration of the host 120 with the DSD 102 is performed during a registration phase which involves the securing, by a registration server 160, of a cryptographic key pair consisting of a private host registration key and a corresponding public (user) device registration key. The DSD 102 is configured to receive the device registration key via a registration token transmitted to the DSD 102 by the host 120 (subsequently to the registration token being secured by the registration server 160).

In one embodiment, the registration key pair is generated by the registration server 160 in response to a registration request made by the host 120 in respect of the DSD 102. The generated registration keys are securely distributed to the host 120 and user device 102 by the server 160, such as by: for the device registration key, the generation and transmission of the registration token in the form of a registration certificate to the DSD 102 (via the host 120 through the data port 106); and, for the host registration key, the use of a secure application layer protocol to communicate with host 120.

Secure communication protocols may be used to transfer the host registration key from the server 160 to the host 120. Further, the host 120 stores and processes the host registration key securely, such as, for example via a dedicated hardware components. This secures the registration of the host 120 with the DSD 102 against an attacker, and in particular against MITM attacks, when the host registration key is transmitted from the server 160 to the host 120 over a wireless data communication channel.

In an alternative embodiment, the registration key pair is generated by the host. The host 120 provides the registration server 160 with the generated registration key pair values, with the registration request made by the host 120 in respect of the DSD 102. On successful validation of the registration request, the server 160 stores the key pair values, and generates a registration token in the form of a digital signature of the public device key value for the host 120 to subsequently transmit to the DSD 102, as above.

Access to the data stored with the DSD 102 is provided to the host 120 during a data access phase, which occurs following the registration phase, That is, the DSD 102 selectively enables the host 120 to read and write to the user data 109 in response to determining that the host 120 is authorized to access the DSD 102. The host 120 provides proof of identity to the DSD 102 via the generation and transmission of an access token that is electronically signed and verified by the respective registration keys. The access token is unique to a data access session of the host 120 for the DSD 102 (e.g., as established when the DSD 102 and physically connected via the data port 106, and ending in response to the ceasing of the connection). On validation the of the access token using the registration keys, the host 120 is permitted access to the user data of the DSD 102 by the setting of an access state of the DSD 102.

In the described embodiments, access to the data content of the DSD 102 is securely provided to the host 120 on a session-by-session basis. The DSD 102 generates session identifiers that vary over time, and provides a unique session identifier to the host 120 for inclusion in the access token. In one implementation, the access token is a certificate including the session identifier and additional information (such as the public device key value) signed by the host with the host private registration key, and sent to the DSD 102 for validation of the host's identity. Alternatively, the host generates the access token as a digital signature of the session identifier, and sends the signature message to the DSD 102 for similar validation. The use of an access token that includes, at least, a representation of a unique session identifier ensures that the host 120 is verified as authorized to read/write to the data of the DSD 102 on each connection between the devices.

In the described system and processes, sets of long-term cryptographic key pairs are utilized in the form of: a registration server public key (RSPB Key) and private key (RSPR Key); and a private host registration key and public device registration key, as described above. The RSPB and RSPR keys are maintained by the registration server 160. The RSPB is provided to the host 120 and device 102 to enable verification of registration tokens (e.g., registration certificates or digital signatures) secured by the server 160 (i.e., by signing the token with the RSPR key known only to the server 160).

The host registration key and the device registration key are specific to each host-DSD registration within the system 100, and are maintained by the respective devices throughout the registration lifetime. To avoid confusion, the host registration key and the device registration key are referred to herein below as "Long Term Host Key" (LTHK) and "Long Term Device Key" (LTDK) respectively. The LTHK and LTDK values are generated by the server 160 according to a public-private key cryptosystem, such as Elliptic Curve Cryptography (ECC) in the described embodiments. The LTHK and LTDK establish the identity of host 120 and device 102 for their lifetime, and are used to validate the Session Keys using the Elliptic Curve Digital Signature Algorithm (ECDSA).

The DSD 102 is configured to control access to data content by selectively setting a data access state of the DSD 102. For example, in the described embodiments, in response to determining that a particular host 120 connected to the DSD 102 (via data port 106) is authorized to access the DSD 102, the DSD 102 sets a data access state of the DSD 102 to "unlocked" to enable the host to read and/or write to the user data 109. The DSD 102 transitions to the unlocked state from a locked state wherein neither reading or writing of the stored user data 109, or any data stored on the DSD 102, is permitted. In some embodiments, the DSD 102 assumes the locked state automatically in response to the disconnection of a host from the data port 106 of the DSD 102. For a flash drive DSD, this automatically secures the data content of the drive when the drive is removed from a host computer system.

The described embodiments of the secure data content access methods and systems achieve the following advantages over conventional approaches to securing a DSD: (i) compared to password-based authentication, protection is provided against a brute-force attack by securing data access based on validation of the host computing device via communication at the application layer; (ii) achieving Perfect Forward Secrecy (PFS) by the use of an access token that is unique for every data access session between the host and DSD (i.e., thereby protecting against an attacker that has gained knowledge of the session identifier of a present or previous session) and the use of ECC for the individual session exchanges (i.e., thereby protecting against attacks that attempt to determine a device private key used for a particular previous session); (iii) use of a remotely located registration server 160 as a centralized authority for securing Long-Term key data, representing the registration of particular the DSD 102 with the host 120, which enables each DSD to validate a received data access request (i.e., by verifying the registered key pair) in real-time; and (iv) providing secure access of a secondary host to the DSD 102 based on a pre-existing registration of the DSD with the (primary) host 120, and the use of a dynamically generated access token (i.e., a certificate or digital signature) to enable the secondary host(s) to access data of the DSD 102 subject to authorization by the primary host 120.

Data Storage Device

FIG. 1*a* shows an embodiment of the secure data content access system (SDCAS) 100 including a user device in the form of a data storage device ("DSD") 102, a host computing system 120, and a registration server 160. Optionally, the SDCAS 100 may include one or more secondary devices 170.

In the described embodiments, the DSD 102 comprises a data path 104 and a controller 110. The data path 104 connects to, or includes, a data port 106 configured to transmit data between host computer system 120 and the DSD 102. The data port 106 is configured to transmit data between the host 120 and the DSD 102 and includes control operations to translate interface protocols (e.g., USB-C to NVMe), and to provide other general device functionality (e.g., to supply power to the DSD 102).

The DSD 102 provides functionality to the host 120 of a block data storage device. The storage medium 108 of the DSD 102 is configured to store user content data 109. The user content data 109 includes one or more blocks of data organized into files, for example including images, documents, videos, etc., according to a particular file system operable by the host computer 120. The storage medium 108 is non-transitory such as to retain the stored block data irrespective of whether the medium 108 is powered. The medium 108 may be a solid state drive (SSD), hard disk drive (HDD) with a rotating magnetic disk, or any other non-volatile storage media. Further, the storage medium 108 may be a block data storage device, which means that the user content data 109 is written in blocks to the storage medium 108 and read in blocks from the storage medium 108.

The host computer 120 is configured to include a device driver and a data/power interface for communicating with the DSD 102 and providing it with power. The data and power interface operates over data port 106, which may be implemented as, for example, some form of USB port (e.g., USB-A, USB-B, USB-C, micro-USB, etc.), a Thunderbolt port, a Power over Ethernet (PoE) port, or a similar port.

In some embodiments, the DSD 102 includes a cryptography engine (not shown) configured to receive, interpret and execute commands received from the host 120 according to a predetermined command set, such as for example the standard Advanced Technology Attachment (ATA) or serial ATA (SATA) and/or ATA Packet Interface (ATAPI) command set, which is available from Technical Committee T13 noting that identical functionalities can be implemented within Trusted Computing Group (TCG) Opal, Small Computer System Interface (SCSI), NVMe, I2C, and other proprietary architectures. The cryptography engine (not shown) is connected between the data path 106 and the storage medium 108 and is configured to use a cryptographic key to encrypt user content data 109 to be stored on the storage medium 108, and to decrypt the encrypted user content data 109 stored on the storage medium 108. However, other embodiments of the DSD 102 (such as a flash drive) do not include a cryptography engine, or any other means to perform data at rest encryption.

Some embodiments of the DSD 102 include I/O components 107 that enable the DSD 102 to receive interactive input from a user, and to provide output to the user in relation to the operation of the DSD 102. In some embodiments, the I/O components 107 include one or more display components configured to display visual content to the user. In other embodiments, such as for a compact flash drive, the DSD 102 lacks any input components, and such that I/O components 107 may only include non-interactive display elements, such as light-emitting diodes (LEDs).

The controller 110 includes a processor 105 configured to execute program code stored within a non-volatile system memory 103 to control the operation of the DSD 102. In the described embodiments, the system memory 103 is configured to store data, including at least: a unique identifier of the DSD 102 referred to as the device identity key (IDK); the LTDK of the DSD 102; one or more tokens (access and registration, as described below) for providing secure data access to a connected host 120; and a registration server public key (RSPB Key). In some embodiments, the RSPB Key is programmed into the DSD 102 at the time of manufacture. In other embodiments, the RSPB Key may be delivered to the memory 103 via a data transfer from an external device (e.g., a flash update through data port 106).

Processor 105 is configured to control the operation of the DSD 102, by performing control operations to facilitate the securing of the data content of the DSD 102. In the described embodiments, the memory 103 stores a Secure Data Access Application (SDAA) 101 that, when executed by the processor 105, implements the functionality associated with secure data content access for the DSD-host registration, as described below.

The implementation of the processor 105, memory 103, and/or SDAA 101 may vary according to the specifications of the device 102. In the described embodiments the DSD 102 is a flash DSD, and the SDAA 101 is implemented as a micro-program arranged as one or more code modules and including data and instructions in relation to secure registration and data access processes, such as 302 and 304 described below. In some embodiments, the SDAA 101 micro-program also includes one or more open source code libraries for performing cryptographic key generation and verification operations (e.g., ECC, and Asymmetric Encryption Standard (AES) algorithm libraries).

The controller 110 is configured to selectively set a data access state (DA state) of the DSD 102 to: an unlocked state to enable access to the user content data 109; or a locked state to disable access to the user content data 109. The controller 110 is configured to generate physical access signals to control the data path 104 such as to enable or disable the transmission of user content data 109 between the host computer system 120 and the non-volatile storage medium 108 via the data port 106. The state of the data path 104, as either enabling or disabling data transmission, is referred to as a physical access state of the DSD.

In another example, the data access state may also be derived based on a cryptographic state of the DSD 102. The DSD 102 utilizes a cryptographic key to selectively: i) decrypt the user content data 109 stored on the storage medium 108; and ii) encrypt one or more of: the user content data 109 stored on the storage medium 108; and data received from the data port 106 to be stored as user content data 109 on the storage medium 108.

In some examples, the controller 110 provides the cryptographic key to at least one component of data path 104 and therefore directs the encryption or decryption of the user content data as part of its control functionality. A cryptography engine encrypts the user content data "on the fly" as it passes through cryptography engine from data port 106 to storage medium 108, and decrypts the encrypted user content data "on the fly" as it passes through the cryptography engine from storage medium 108 to data port 106.

In some examples, the cryptographic state may be independent of the physical access state. That is, the DSD 102 may enable transmission of data through the path 104, independently to whether the data retrieved from, and stored into, the storage medium 108 is encrypted and decrypted by a cryptography engine.

In some embodiments, such as for a flash DSD described below, there is no encryption of the user content data 109 and the DSD 102 controls access to user content data 109 by the selective setting of the physical access state by the access controller 110 of the DSD 100 (i.e., the control of whether the host 120 can exchange data in any form, encrypted or plain, with the device 100). That is, the data access state of the DSD 102 is "locked" or "unlocked" in accordance with the corresponding physical access state. In such implementations, the access controller 110 is configured to set the enable signal to selectively set the data access state of the device 102, to either: an unlocked state to enable transmission of user content data 109 between the host computer system 120 and the storage medium 108 via the data port; or a locked state to disable transmission of user content data 109 between the host computer system 120 and the storage medium 108 via the data port 106.

That is, when in the locked state the controller 110 is configured to ignore data read and/or write requests received from the data port 106. The DSD 102 is configured to assume the locked data access state as a default state, and to transition to the locked state in response to a disconnection of the host 120 from the data port 106. In response to the DSD 102 transitioning into the unlocked data access state, the controller 110 enables reading and writing of data from and to the storage media 108, including the user data 109.

Host Computer Device

Figure 2:
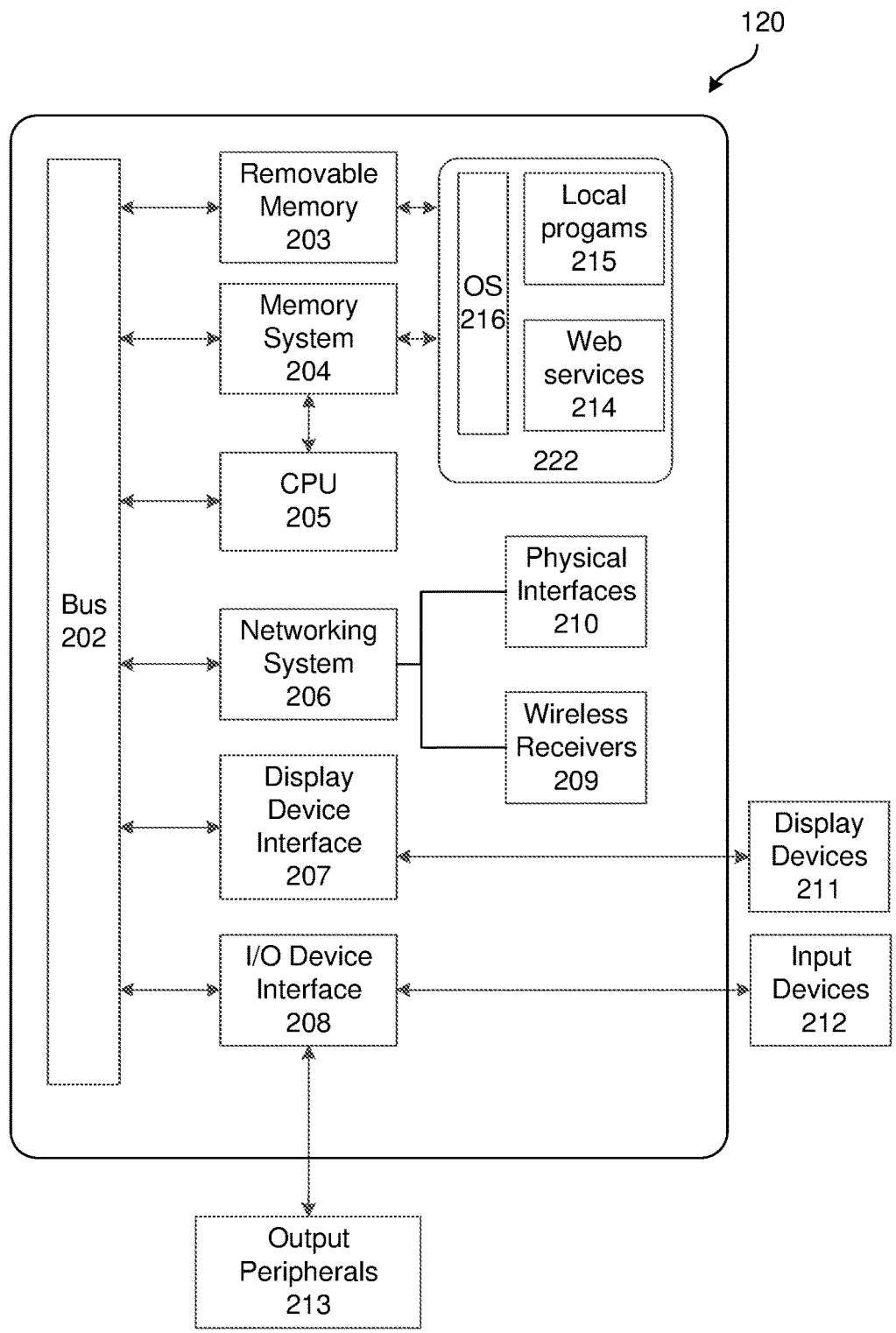
FIG. 2 is a block diagram of an exemplary host device implemented as a mobile computing device according to one embodiment.

Referring back to FIG. 1*a*, the host device 120 is configured to communicate with the DSD 102 through a direct physical connection via data port 106, and with the registration server 160 through communications network 150. In the described embodiments, the host device 120 is a mobile computing device, such as a smart phone or tablet (as shown in FIG. 2 and described below). The host 120 is configured to execute a Secure Data Access Host application (SDAHA) 121, which may be: a mobile application in the form of a dedicated software program obtainable from a digital distribution platform that provides applications for an operating system executing on the device (e.g. Google Play Store or Apple Store). Alternatively, the SDAHA 121 may be a generic software application, such as a web browser configured to render one or more webpages hosted by a dedicated web server (e.g., as provided by the manufacturer of the DSD 102), SDAHA 121 includes at least, a user interface module 122, and a local memory module 124 configured to store data in relation to the operation of the host 120 in association with one or more registered devices 102. For example, in some embodiments the memory 124 is configured to store registration data 126 for each device 102 registered to the host 120, including: an identifier of the DSD 102 (e.g., the IDK); a LTHK, for the host 120; and a corresponding registration certificate containing a LTDK of the device 102, where the LTHK and LTDK are a cryptographic LT key pair (as described below).

In some embodiments, the memory module 124 is also configured to store session data 125 including data related to any active data access session presently established between the host 120 and a registered device 102. The session data 125 may include: the IDK of the device 102; a session ID for the session; an access token generated by the SDAHA 121 for the device 102 and session ID enabling data access for the host 120.

FIG. 2 illustrates a block diagram, according to one embodiment, of a host device 120 implemented as a mobile computing device, and comprising a central system bus 202, a removable memory 203, a memory system 204, a central processing unit (CPU) 205, a networking system 206, display interfaces 207, and I/O device interfaces 208. The processing unit 205 may be any microprocessor which performs the execution of sequences of machine instructions, and may have architectures consisting of a single or multiple processing cores such as, for example, a system having a 32- or 64-bit Advanced RISC Machine (ARM) architecture (e.g., ARMvx). The processor 205 issues control signals to other device components via the system bus 202, and has direct access to at least some form of the memory system 204.

The memory system 204 provides internal media for the electrical storage of the machine instructions required to execute the user application. The memory system 204 may include random access memory (RAM), non-volatile memory (such as ROM or EPROM), cache memory and registers for fast access by the processing unit 205, and high volume storage subsystems such as hard disk drives (HDDs), or solid state drives (SSDs). Individual memory system components, such as the high volume storage subsystems, may include separate interfaces and/or buses to the main system bus in order to increase data transfer efficiency. A removable memory system 203 may be implemented in the form of flash drives or removable high volume storage devices, connectable to the device 120 via a data port implementing a particular data transfer protocol, such as for example Universal Serial Bus (USB).

A portion of the non-volatile memory within the memory system 204 may contain a Basic Input/Output System (BIOS) which includes routines facilitating the communication of data and control signals between components of device 120. The processes executed by the host 120 are implemented as programming instructions of one or more software modules 222 stored on non-volatile storage of the memory system 204 and/or removable memory 203. In some other embodiments, the processes may be executed by one or more dedicated hardware components, such as field programmable gate arrays (FPGAs) and/or application-specific integrated circuits (ASICs).

The modules stored include an operating system 216, one or more local application programs 215, and one or more web services modules 214 providing Internet or networked data access functionality. As described herein, the one or more local application programs includes the SDAHA 121. Program data stored within the modules 222 may include data instructions and results produced or used by the SDAHA 121. More generally application programs 215 may include methods, data structures or other software services that define data or perform functions as required by the device 120. The data and instructions of an application program 215, and the operating system 216, may reside in multiple parts of the memory system 204, including the registers, cache, main memory, and high volume storage, or in the removable memory 203.

The system bus 202 provides functionality enabling the exchange of data between the components of the device 120. The system bus enables the processing unit 205 to issue control signals to other components, including memory system 204, for the purpose of transferring data. The system bus 202 may be of varying structure, and may possess one or more sub-buses such as a memory bus interconnecting the memory system 204 components and/or a peripheral bus such as AGP or PCI.

The I/O device interface 208 provides functionality enabling the user to interact with the device 120 via one or more I/O devices such as a mouse and keyboard. Other external user input devices 212 which may be connected include a microphone, an IR remote control, camera, and gesture systems. The device 120 includes one or more onboard input devices such as a touchpad or touch screen enabling a user to interact with the device 120. The I/O device interface 208 also provides functionality for the device 120 to instruct output peripherals 213, which may include printers, audio devices, and imaging devices.

The display device interface 207 may include one or more dedicated graphics interfaces, which transmit graphics and video signals between the device 120 and display devices 211. The display devices 211 may consist of inbuilt displays, including for example a display panel. In the described embodiments, display devices 211 are at least configured to display an indication of a connected device (e.g., DSD 102) visually to the user, as instructed by the SDAHA 121.

The device 120 is connectable to a networking system 206 through a wireless or wired transmission media enabling the logical connection of the host computing device 120 to other networked computing devices. Connections to networks or other computing devices are formed via communication subsystem 130, which may include wireless transceivers 209 and/or physical interfaces 210. Communication subsystem 130 enables the exchange of data between the host 120 and one or more other devices. Communications subsystem 130 is configured to connect the host 120 to the one or more other devices via a communications network which may be a local area network (LAN) or a wide area network (WAN), such as the Internet.

In the described embodiments, the communication subsystem 130 is configured to implement one or more protocols, such as for example the IEEE 802.xx family of protocols, for wired or wireless communication with registration server 160, and one or more secondary devices 170, over network 150 (i.e., including one or more LANs, WANs, and/or Internet networks).

The skilled person in the art will appreciate that many other embodiments may exist including variations in the hardware configuration of device 120, and the distribution of program data and instructions to execute the SDAHA 121.

Registration Server

With reference to FIG. 1*a*, the registration server 160 is implemented as one or more computing devices configured to operate as a web server. The registration server 160 includes computing components configured to execute one or more modules including, for example, an operating system, one or more local application programs, and one or more web services modules providing Internet or networked data access functionality. The web services modules may include web server software (e.g., Apache), scripting language modules (e.g., PHP, or Microsoft ASP), and structured query language (SQL) support modules (e.g., MySQL) enabling data to be stored in, and retrieved from, a data store 162.

In the described embodiments, data store 162 is configured as an SQL database with one or more tables including: a Registration table 164; a Device Info table 166; and a Long Term Key table 168. Registration table 164 records the registration of a DSD 102 with a corresponding host device 120. Each registration table entry identities the DSD 102 and host 120 pair by indexing corresponding entries in the Device info table 166. Registration table 164 also records the Long Term (LT) Key pair associated with a registration of a device with a host by referencing an entry in the Long Term Key table 168.

The Device Info table 166 records information identifying each host 120 and DSD 102 known to the SDCAS 100. Each entry of the Device Info table 166 includes a device identifier key (IDK) uniquely identifying the DSD. The MK may be a globally unique value which distinguishes the DSD 102 from all others such as a serial number of the DSD 102 generated at the time of manufacture. In other embodiments, the IDK may be generated by the server 160, or the host 120 and validated by the server 160, to locally distinguish the each device from all other devices managed by the system 100. For example, the server 160 may designate an IDK for DSD 102 based on a serial number of the device, as specified arbitrarily by the host 120 (e.g., at a time when the device 102 is registered to the host 120, and via the SDAHA 121).

In some embodiments, the Device Info table 166 is configured to store general information related to the properties of the device, as obtained from the SDAHA 121. The device properties may include, for example, an indication of the capacity of the storage medium 108.

Host device 120 provides device information to the registration server 160 for storage in Device Info table 166 via the SDAHA 121. In some embodiments, the SDAHA 121 provides the registration server 160 with the host device information during a configuration or setup routine that is executed prior to any registration or data access operations involving the host 120 (referred to as host enrollment). For example, enrollment may occur during or directly following the installation of the SDAHA 121 on the host 120.

In some embodiments, Device Info table 166 entries, which record information of devices associated with the system 100, exist independently of entries in the Registration table 164, which record present registrations of host-DSD pairs. That is, a DSD 102 that is not registered with any corresponding host device may still have an entry in the Device Info table 166, for example, as a result of the removal of a previous registration of the DSD with a host.

Long Term Key table 164 stores cryptographic Long Term Key pairs, each including a Long Term Device Key (LTDK) of the device and a Long Term Host Key (LTHK) of the host, for each device to host registration. The LTDK and LTHK values are represented as strings within the table 168. In some embodiments, the LTDK and/or LTHK may be stored in a secure form, for example as an encrypted or hashed text of the actual key value. In one embodiment, the LTDK and LTHK values are generated by a key generator module 163 of the server 160 at a time of registration of the pair with the system 100. In another embodiment, the LTDK and LTHK values are generated by the host 120 (e.g., by a local key generator module 128 of the SDAHA 121) and are passed to the server 160 during the registration of the host 120 with the DSD 102. The registration server 160 stores the received LTDK and LTHK values in the table 168 in a secure form, as described above.

Registration server 160 also includes a communications module 161 that exchanges data computer devices, including the host device 120, through communications network 150 using, for example, protocols such as Transmission Control Protocol (TCP) or Internet Protocol (IP) for Internet communication. In some embodiments, the SDAHA 121 is configured to enforce data exchanges between the registration server 160 and the host 120 using a secure protocol, such as Hypertext Transfer Protocol Secure (HTTPS).

Secondary Host Devices

Figure 1B:
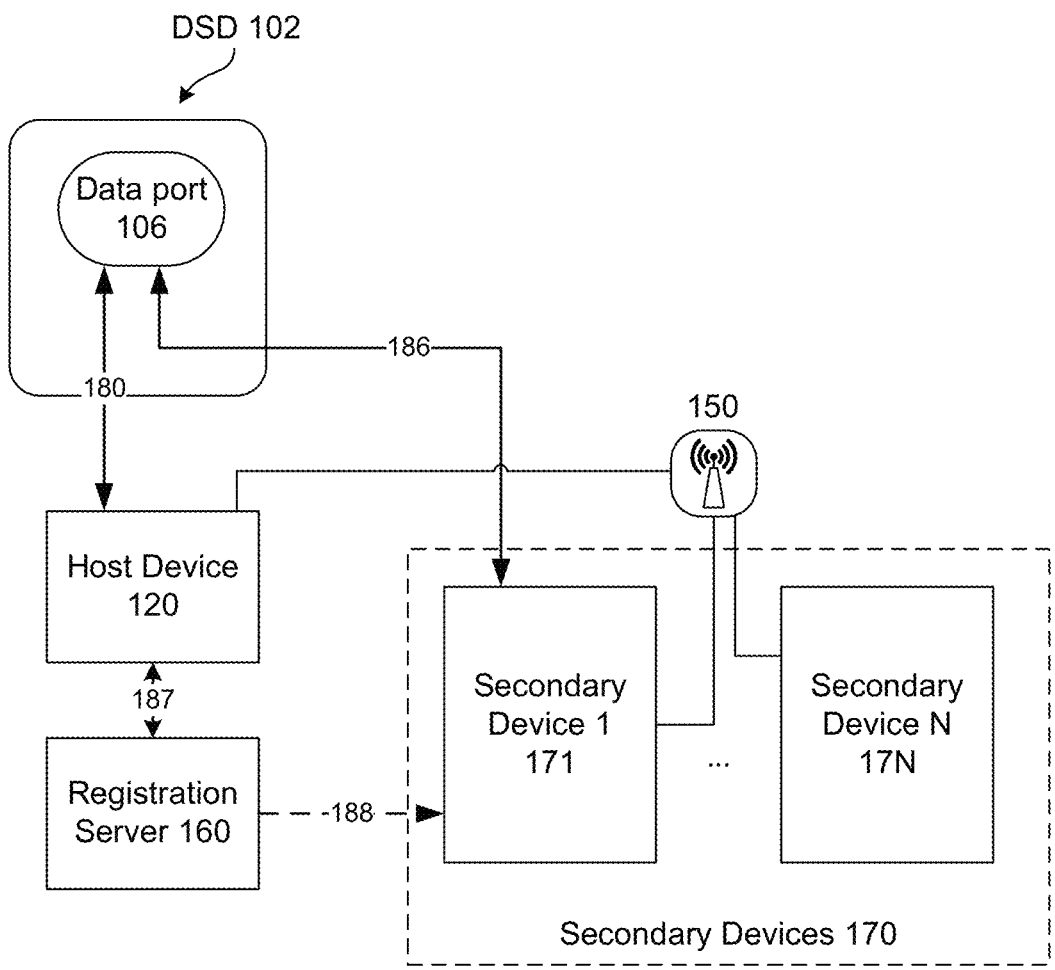
FIG. 1b illustrates a block diagram of communication between an example data storage device, an example host device, and one or more secondary devices according to one embodiment.

FIG. 1*b* shows secure wireless communication channels formed between the DSD 102, one or more secondary devices 170, and the host device 120 by the SDCAS 100. The host device 120 and DSD 102 are physically connected via the data port 106, through which at least data is capable of being exchanged between the devices.

The host 120 is configured to enable a secondary device 171 to access data of the DSD 102 via connection to the data port 106 (shown as 186). That is, host 120 is configured to authorize the secondary device 171 to access the user data of the DSD 102 subsequent to a connection of the secondary device 171 to the DSD 102, such as for example via a USB connection 186 to the data port 106. In response to the host 120 granting authorization for the secondary connection 186 to the registration server 160, the registration server 160 generates an access token 188 to enable the secondary device 171 to access data of the DSD 102. In the described embodiments, the access token 188 is in the form of a session specific certificate, or digital signature, that is generated by the server 160, and cryptographically secured based on the pre-established registration of the host 120 and the DSD 102.

Secure Data Content Access Process

Figure 3A:
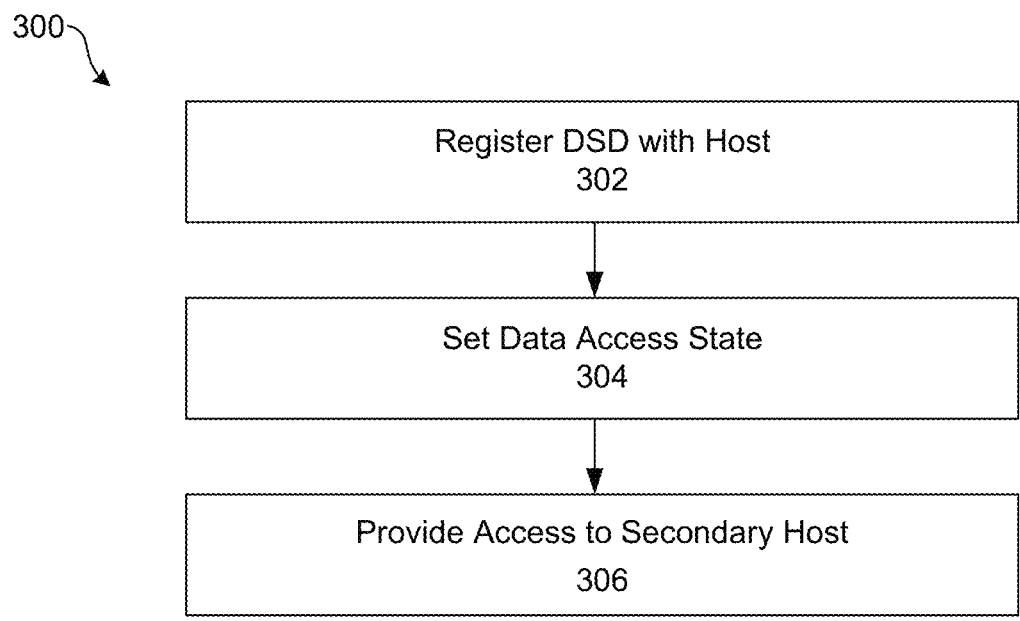
FIG. 3a is a flow diagram of a process for performing secure data content access by system 100 according to one embodiment.
Figure 3B:
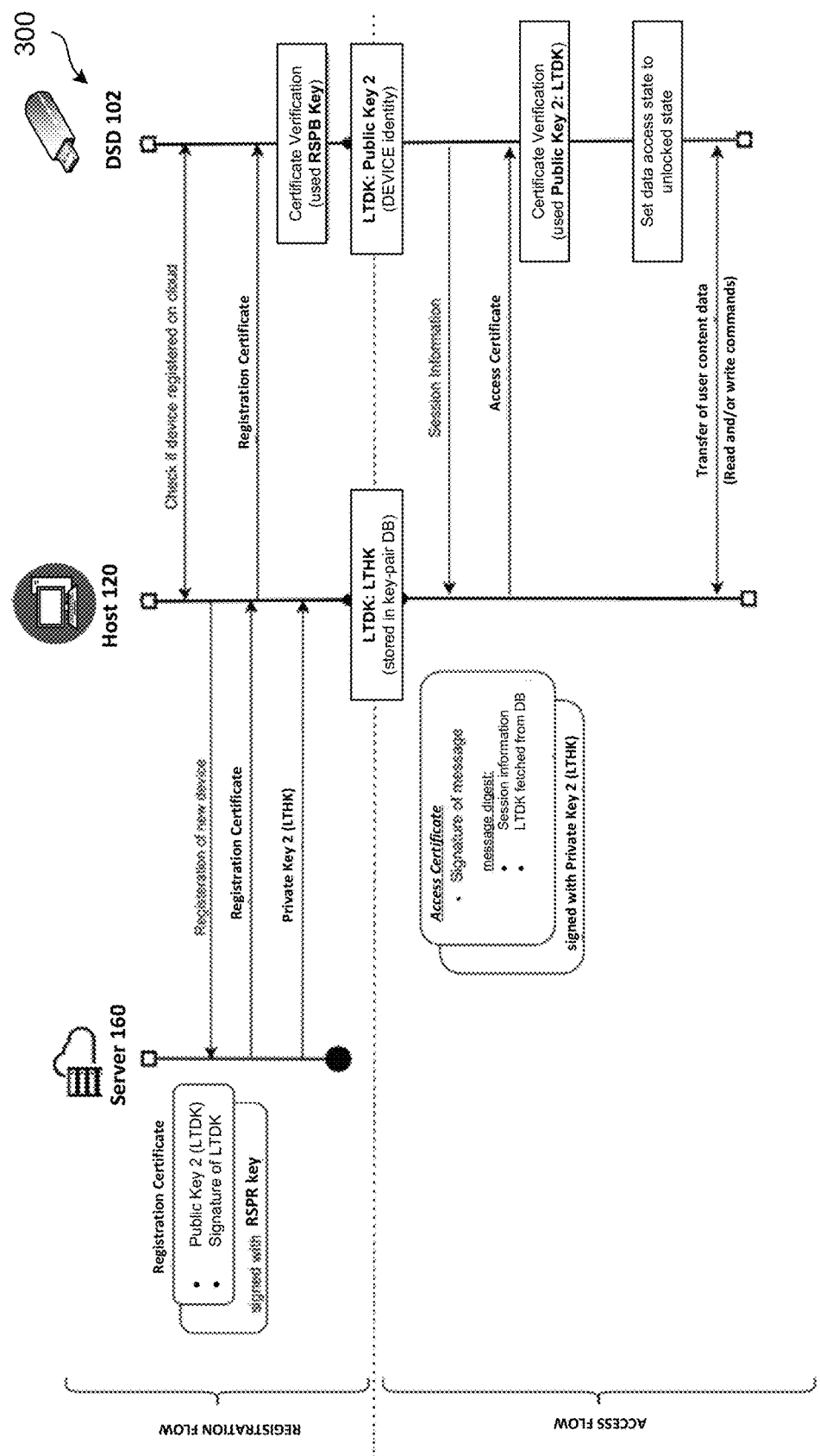
FIG. 3b is a first sequence diagram of a process for performing secure data content access by system 100 according to one embodiment.
Figure 3C:
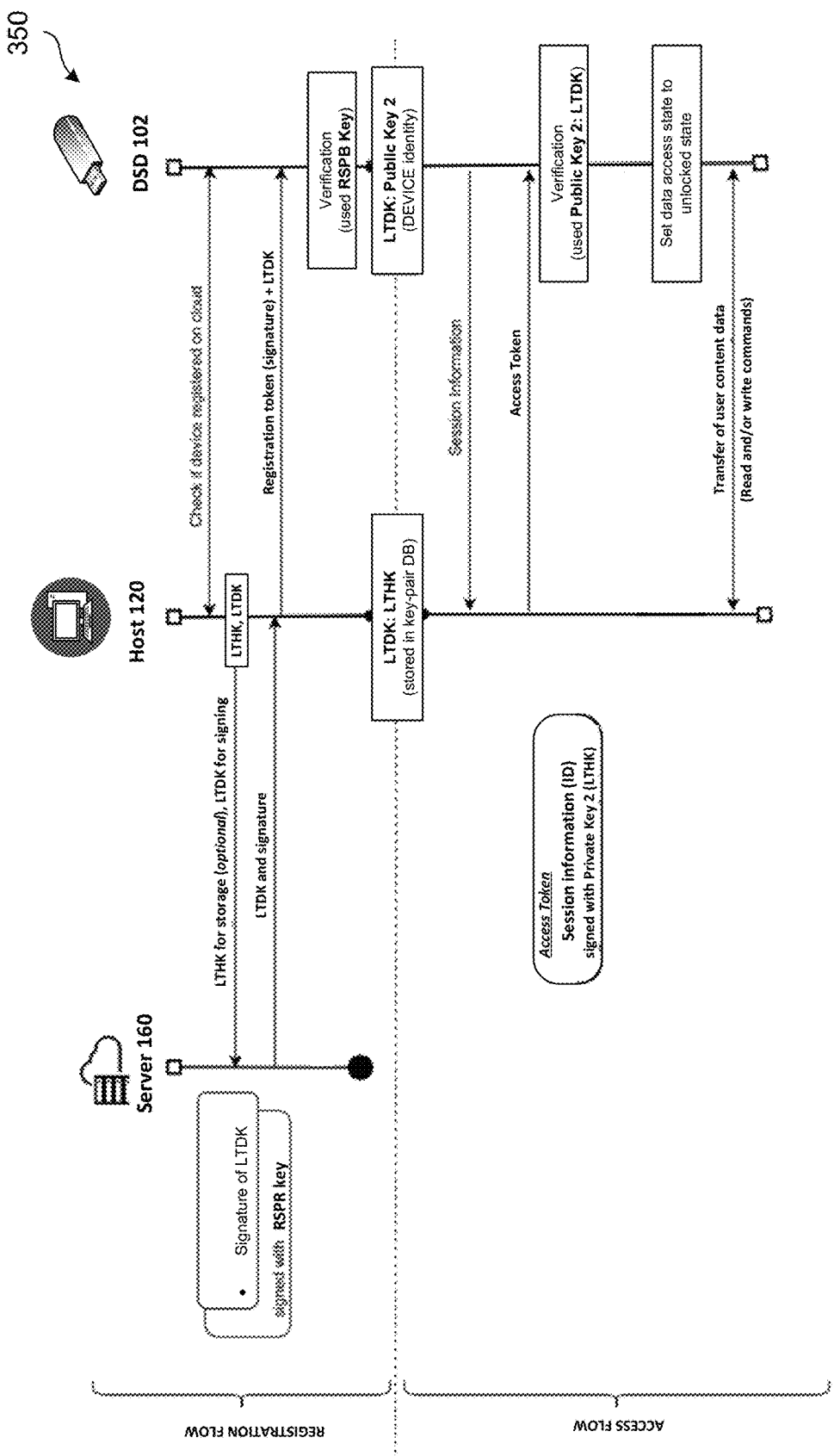
FIG. 3c is a second sequence diagram of a process for performing secure data content access by system 100 according to one embodiment.

FIG. 3a illustrates a flow diagram, and FIGS. 3b and 3c illustrate sequence diagrams, respectively of a process 300 for performing secure data content access with system 100. At step 302, the DSD 102 is registered with the host device 120 to enable secure data access between the devices. Registration may be performed following the acquisition of the DSD 102 by a user of the host 120 (i.e., as a means to claim ownership of the DSD 102 by registering the DSD 102 with the user's computer 120).

Figure 4:
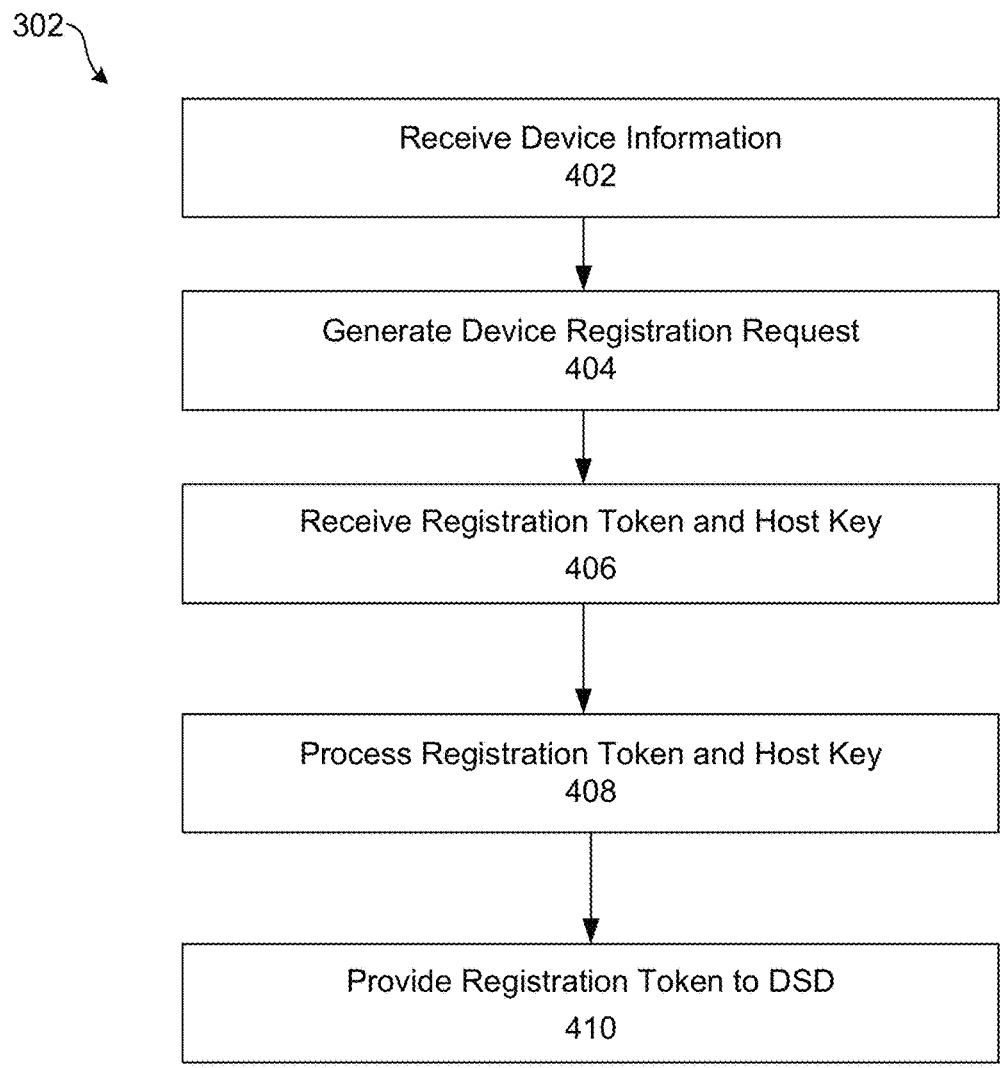
FIG. 4 is a flow diagram of a device registration sub-process of the secure data content access process according to one embodiment.

FIG. 4 illustrates a device registration sub-process performed by the host 120. At step 402, the host 120 receives DSD information for performing the registration. A device information request is generated and transmitted to the DSD 102 by the SDAHA 121 of the host 120. In some embodiments, the requested device information includes, at least, an indication of the IDK of the DSD 102 and the current LTDK of the DSD 102.

Controller 110 of the DSD 102 processes the registration request by searching memory 103 for a stored. LTDK. In some embodiments, the controller 110 of the DSD 102 is configured to return a value indicating a true or false response to the registration request (i.e., without indicating the LTDK). In other embodiments, the actual value of the LTDK stored in memory 103 is returned in response to the registration request. If the DSD 102 is not registered with any host 120 of the system 100, then no LTDK value is stored in the memory 103, and a null value is returned.

At step 404, the host 120 generates a device registration request for server 160 to register DSD 102, the request including the device information obtained at step 402. In embodiments, where the host 120 is configured to generate the LTHK and LTDK pair, the host 120 provides at least the generated LTDK of the DSD 102 to the server 160. The device registration request may also include information of the host device 120, including the host IDK and/or the LTHK. The registration server 160 processes the device registration request and validates the device information to determine the validity of the request. Fax example, the server 160 may check the supplied IDK and LTDK values against the Registration 164, LT Key 168 and Device 166 information of the data store 162. The device registration request is determined to be invalid in the case that, for example, a registration is already recorded in the data store 162 for the DSD 102.

In response to determining that the device registration request is valid, registration server 160 registers the DSD 102 in association with host 120 by: 1) securing the Long Term Device Key (LTDK) of the DSD for the host-device registration; 2) generating a registration token to securely provide the LTDK to the DSD 102; and 3) (optionally if required) securely transmitting the corresponding LTHK to the host 120. In some embodiments, registration server 160 stores data representing the registration in the data store 162. For example, the server 160 may record an indication of the registration of device 102 with the host device 120 in the registration table 164, and record the Long Term key pair in the LT Key table 168.

In some embodiments, such as those shown in FIG. 3b, the server 160 is configured to generate the Long Term Key Pair by invoking key generator 163. In other embodiments, such as those shown in FIG. 3c, the Long Term Key Pair generation is performed analogously by the local key generator 128 of the host 120, and provided to the server 160 as part of the device registration request. In some embodiments in which the host 120 generates the Long Term Key Pair, the host 120 provides the LTHK to the server 160 conditionally. For example, the host 120 may be configured to determine whether a backup of the LTHK is required by the server 160, and to only transmit the LTHK to the server 160 in response to a positive confirmation of the backup. In other embodiments, the host 120 may be configured to delay the transmission of the LTHK to the server 160 until a suitable connection is established between the host 120 and the server 160. For example, the SDAHA 121 may enforce a requirement of a secure connection existing between the host 120 and the server 160 before initiating transmission of the LTHK value.

The Long Term Key Pair includes a private LTHK value and a public LTDK value generated by the key generator 163. In the described embodiments, the key generator 163, or local key generator 128, implements a set of operations collectively configured to generate the LTHK and LTDK values using Elliptic-curve cryptography (ECC). The private and public key values are created based on key generation parameters, including: a public key length; a private key length; and an FCC curve. The key generator 163, local key generator 128, is configured to access a representation of at least one ECC curve from the generation parameters, such as secp256k1, curve25519 or p521. The representation includes an indication of one or more key parameters, such as a curve name (e.g. secp256k1), a field size (which defines the key length. e.g. 256-bit), a security strength (usually the field size/2 or less), a metric indicating curve performance (e.g., operations/sec), and other domain parameters relevant to the cryptographic utility of the curve.

The ECC curve used for the key generation may be determined selectively by the key generator 163, local key generator 128, e.g., based on input from an administrative user and/or other authority. In some embodiments, a particular curve is allocated as the default curve for key generation (e.g., secp256k1). Key generator 163, or local key generator 128, is configured to retrieve the key parameters for the selected or default curve (in the absence of a selection) prior to generating the key values. For example, the domain parameters for the 256-bit curve secp256k1 implementation are defined as follows:

p (modulus)=0xFFFFFFFFFFFFFFFF-
FFFFFFFFFFFFFFFFFFFFFFFFFFFFFFFF-
FEFFFFFC 2F n (order; size; the count of all possible EC points)=0xFFFFFFFFFFFFFFFF-
FFFFFFFFFFFFFFFEBAAEDCE6AF48A-
03BBFD25E8CD036 4141 a (the constant "a" in $y^2 \equiv x^3+a*x+b$ (mod p))=0x0000000000000000000000000000000-
000000000000000000000000000000 b (the constant "b" in $y^2 \equiv x^3+a*x+b$ (mod p))=0x0000000000000000000000000000000-
000000000000000000000000000007 g (the curve generator point G {x, y})=
(0x79BE667EF9DCBBAC55A06295CE870B0702-

9BFCDB2DCE28D959F2815B16F81 798, 0x483ada7726a3c4655da4fbfc0e1108a8fd17b44-8a68554199c47d08ffb10d4b8); and h (cofactor, typically 1)=01.

The private key is generated by a getPrivateKey(curve) routine that outputs an integer in the range of the curve's field size as a hex encoded value. An example of a 256-bit ECC private key generated by the key generator 163 is: 0x51897b64e85c3f714bba707e867914295a1377a7463a-9dae8ea6a8b914246319. Key generator 163, or local key generator 128, implements a corresponding routine getPublicKey(curve) to determine a corresponding public key by compressing the elliptic curve points (EC points) associated with the selected curve. The compressed public key value (i.e., the LTDK value) corresponding to the 256-bit ECC private key (i.e., the LTHK value), is a 257-bit integer. For example, the ECC public key corresponding to the above private key is: 0x02f54ba86dc1ccb5bed-0224d23f01ed87e4a443c47fc690d7797a13d41d2340e1a.

In other embodiments, the key generator 163, or local key generator 128, implements a set of operations collectively configured to generate the LTHK and LTDK values using an alternative public-private key cryptosystem, such as for example, RSA. The skilled addressee will appreciate that the methods and techniques described herein may also be performed with the use of any such alternative public-private key cryptosystem to determine the LTDK-LTHK pair.

Server 160 creates a registration token for the secure transmission of the LTDK value to the DSD 102. In the one embodiment, the registration token is a registration certificate that includes: certificate data, including at least the LTDK value; and a signature of the certificate data. The signature of the certificate data cryptographically verities that the data (i.e., at least, the LTDK value) included in the registration certificate is generated by the server 160 (i.e., that it has not been modified by an unauthorized party).

In another embodiment, the registration token data includes only the LTDK, the server 160 generates the registration token as a signature of the LTDK by applying a hashing function (e.g., SHA-1) to produce a hash value uniquely representing the LTDK value. The server 160 generates the signature by encrypting the LTDK hash value with the registration server 160 private key value (RSPR Key), for example as: Sign(RSPR Key, hash(LTDK)). The RSPR Key is generated and stored in a non-volatile memory of the server 160 at a time prior to the registration.

At step 406, the host 120 receives registration information, including the registration token and the LTHK, from the registration server 160. The transfer of the LTHK value from the server 160 to the host 120 occurs via a secure HTTPS connection, thereby preventing an attack (such as a MITM attack) from compromising the LTHK during the transmission from server 160 to host 120. In some embodiments, the registration token is also transmitted to the host 120 via HTTPS.

The host 120 processes the received registration token and the LTHK value at step 408. In the described embodiments, the SD AHA 121 is configured to generate values of the registration data 126 for the registration of DSD 102 with the host 120, including: the IDK of DSD 102; and the LTHK for signing data access tokens to be provided to the DSD 102 (as described below). In some embodiments, the host 120 also stores the registration token containing the LTDK of the DSD 102 as part of the registration data 126.

In some embodiments, the host 120 is configured to store some, or of the registration data 126 securely. That is, the LTHK may be stored within a dedicated hardware or software module depending on the device or operating system environment of the host 120, such as, for example, the Secure Enclave component in the Apple platform, or the Key store feature on the Android platform. The Secure Enclave component is a secure co-processor that includes a hardware-based key manager isolated from the main processor (i.e., to provide an extra layer of security for handling sensitive data). The Key store feature provides functionality to restrict when and how keys can be used, such as requiring user authentication for key use or restricting keys to be used only in certain cryptographic modes. Such secure storage and processing mechanisms greatly increases security of the LTHKs managed by the host 120, and therefore reduces the likelihood that an attacker will be able to discover the LTHK and therefore gain access to data stored on the DSD 102, via the host 120.

At step 410, the host 120 transmits the registration token to the DSD 102 via the data port 106. The controller 110 performs a two-step process to verify the received registration token and obtain the LTDK. Firstly, the DSD 102 performs a decryption operation on the token with the RSPB Key. The RSPB Key is stored in non-volatile memory 103 and is programmed into the DSD 102 at manufacture. Even if the registration token is intercepted during the transmission to the host 120, an attacker will not have knowledge of the RSPR Key used to sign the registration token, and therefore cannot forge the signature value.

The decryption of the token with the RSPB Key provides a value representing the hash of the token data, as generated by server 160. The controller 110 applies the same hashing function as used by the server 160 (e.g., SHA-1). In embodiments in which the registration token is a signature, the value of the LTDK is inherent. In embodiments in which the token is a certificate, the controller 110 extracts the LTDK value from the certificate digest. In response to a match between the output of the decryption of the signature and the hash generated locally by the controller 110, the registration certificate, or signature, is considered valid. That is, in this case the DSD 102 has verified that the token originated from the server 160, and the registration token, and therefore the corresponding LTDK, is validated. In response to the validation of the registration token by the DSD 102, as received from the host 120, the LTDK of the token is stored within the memory 103 of the DSD 102.

The registration step 302 may be initiated by the SDAHA 121 of the host 120 in response to the selection of a registration operation by a user of the application 121 (e.g., selecting "Register a new device" on the UI 122). Host 120 generates and transmits a registration request to the DSD 102. The registration request may include an identifier of the host 120, such as an IDK value, a host hardware ID value, or a host device network address value.

In response to receiving the registration request, the DSD 102 is configured to generate and transmit a registration acknowledgement indicating whether the DSD 102 is able to be registered with host 120. In some embodiments, a positive indication of registration is provided when one or more particular registration conditions are met, including for example: the DSD 102 is presently not registered to any host (e.g., as indicated by a null LTDK); and the DSD 102 is placed into a 'registration mode'. In some embodiments, the registration mode enables the DSD 102 to be registered to a requesting host device 120 irrespective of any present registration with any particular host. The registration mode may be activated for the DSD 102 via the actuation of a physical element on the DSD 102 (e.g., a 'registration' or 'reset' button), or by the receipt of a registration activation message by the DSD 102.

Figure 5:
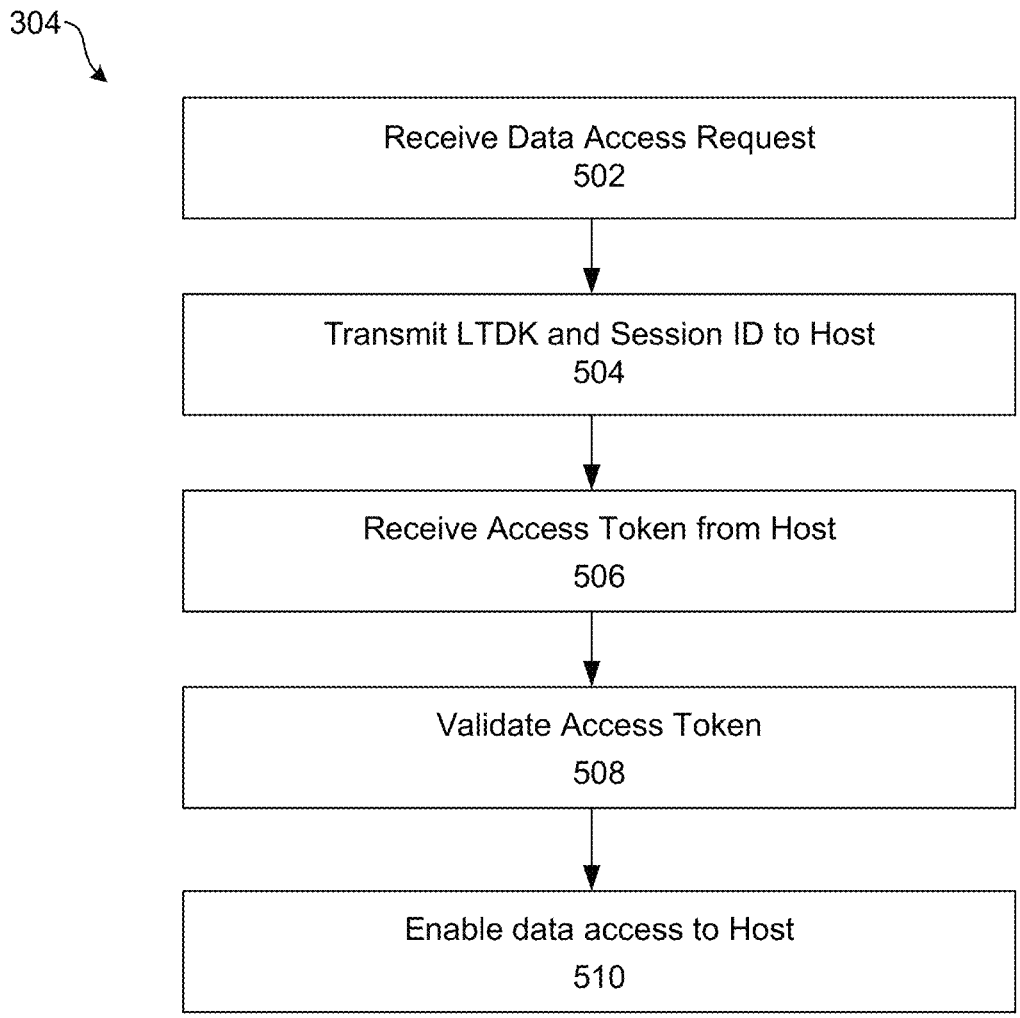
FIG. 5 is a flow diagram of a host access sub-process of the secure data content access process according to one embodiment.

Following registration, at step 304 of FIGS. 3*a* and 3*b* the DSD 102 securely controls the access of the data content to host 120. FIG. 5 illustrates a secure data access sub-process performed by the DSD 102 for the registered host 120. At step 502, the DSD 102 receives a secure data access request from host 120. The data access request is generated and transmitted by the SDAHA 121 of the host 120. For example, the user of the host device 120 may operate interactive interface elements rendered by the UI module 122 to select the DSD 102, and to select a corresponding "Request data access" option.

In other embodiments, the host 120 is configured to automatically generate a data access request on the establishment of a physical connection between the DSD 102 and the host 120 (i.e., in response to the DSD 102 and host 120 connecting through data port 106).

At step 504, in response to receiving the secure data access request, the DSD 102 transmits an acknowledgement to the host 120. In the described embodiments, the acknowledgement includes the LTDK of the DSD 102 and a session identifier uniquely generated by the DSD 102 for the data access session of the host 120. The data access session commences on establishment of the connection of the host 120 to the data port 106 of the DSD 102. The returned LTDK value is processed by the SDAHA 121 of the host 120 to determine whether registration with server 160 must be performed prior to the creation of a secure wireless connection with the DSD 102. For example, if the LTDK value is null then the host 120 initiates the registration process of step 302 to register the DSD 102 with the host 120.

In response to verifying that the DSD 102 is registered with the host 120, the host 120 generates an access token to request access to enable the exchange of data with the DSD 102. The access token includes at least, a representation of the session identifier (session ID) that is unique for the data access session between the DSD 102 and the host 120. The access token is secured by the generation of a cryptographic signature by the host 120. The SDAHA 121 is configured to hash the access token data, and sign the resulting hash value with the private host key (i.e., the LTHK).

In some embodiments, to access token is a certificate with a digest including additional data to the session ID, such as for example the LTDK of the DSD 102. In other embodiments, the access token includes only session ID value. The access token is digitally signed with the LTHK of the host 120 and transmitted to the DSD 102 via the data port 106.

At step 506, the DSD 102 receives the signed access token from the host 120. Since the LTHK of the host 120 and the LTDK of the DSD 102 form a cryptographic Long Term Key pair, and since the LTHK value is kept secret by the host 120, the data contained within the access token is secured against unauthorized modification, and provides verification that the host 120 is the entity requesting access to the data of the DSD 102.

At step 508, the DSD 102 validates the access token to determine the host 120 as authorized to access the DSD 102. The controller 110 of the DSD 102 extracts the cryptographic signature value from the token and performs a decryption operation on the signature value using the LTDK. The controller 110 applies the same hashing function as used by the SDAHA 121 of the host 120 (e.g., SHA-1) to the access token data. The controller 110 identifies the session ID value, depending on whether the access token is a certificate or a digital signature of the ID value. In response to a match between the output of the decryption of the session ID signature and the hash generated locally by the controller 110, the access token is considered valid. That is, in this case the DSD 102 has verified that the access token originated from the host 120, since only host 120 has knowledge of the LTHK corresponding to the LTDK, and therefore that the host 120 is authorized to access the DSD 102.

Enabling Data Access to the Host

At step 510, in response to determining the host 120 as authorized to access the DSD 102, the DSD 102 selectively sets the data access state of the DSD 102 to an unlocked state. In the described embodiments, the data access state is represented by an access state variable stored in the controller 110. The access state variable is configured to indicate that the DSD 102 is either in: an unlocked state in which access to the user content data 109 is enabled; or a locked state in which access to the user content data 109 is disabled. In the described embodiments, the data access state is a physical access state enforced by the enabling or disabling the transfer of data to and from the storage medium via the data path 104.

In some embodiments, the controller 110 is configured to generate physical access signals to control the ability to transfer data from the storage medium 108 onto the data path 104 based on the access state variable. For example, in response to a transition to the locked state, the controller 110 generates a 'disable physical access' signal preventing reading data from, or writing data to, the medium 108. Any data read and/or write commands issued to the DSD 102 by the host 120, including reading from or writing to the user content data 109, are ignored by the controller 110 when in the locked state.

In response, to setting the data access state to the unlocked state, the controller 110 is configured to process commands issued by the host 120 read and/or write the user content data 109. The DSD 102 remains in the unlocked state for the duration of the data access session established between the DSD 102 and the host 120. In some embodiments, the data access session persists for the duration of the physical connection between the DSD 102 and the host 120 (e.g., terminating in response to the removal of the flash drive DSD 102 from the host computer 120, or in response to the DSD 102 ceasing to receive power via the data port 106). In some embodiments, the data access session may be configured to persist for a predetermined time duration, where the expiry of the duration results in a requirement to perform a subsequent validation of the authorization of the host 120 to access the user data of the DSD 120.

In some embodiments, the data access session terminates in response to the termination of a logical connection between the DSD 102 and the host 120. For example, the DSD 102 may terminate the data access session in response to the operating system of the host 120 initiating a 'remove device' operation to logically disconnect the DSD 102 from the host system (e.g., as a step performed by a user of the host 120 prior to physical disconnection of the DSD 102 from the host 120).

Secure Secondary Host Connection

With reference to FIG. 3*a*, following the registration of the DSD 102 to the host 120, at step 306 the SDCA system 100 is configured to provide one or more secondary host devices 171-17N secure access to the user data of the DSD 102. The provision of a secondary device with secure access to the user data of the DSD 102 is based on the prior verification of the (primary) host 120 as authorized to access the DSD 102 (i.e., on the existence of a registration of the primary host 120 with DSD 102).

Figure 6A:
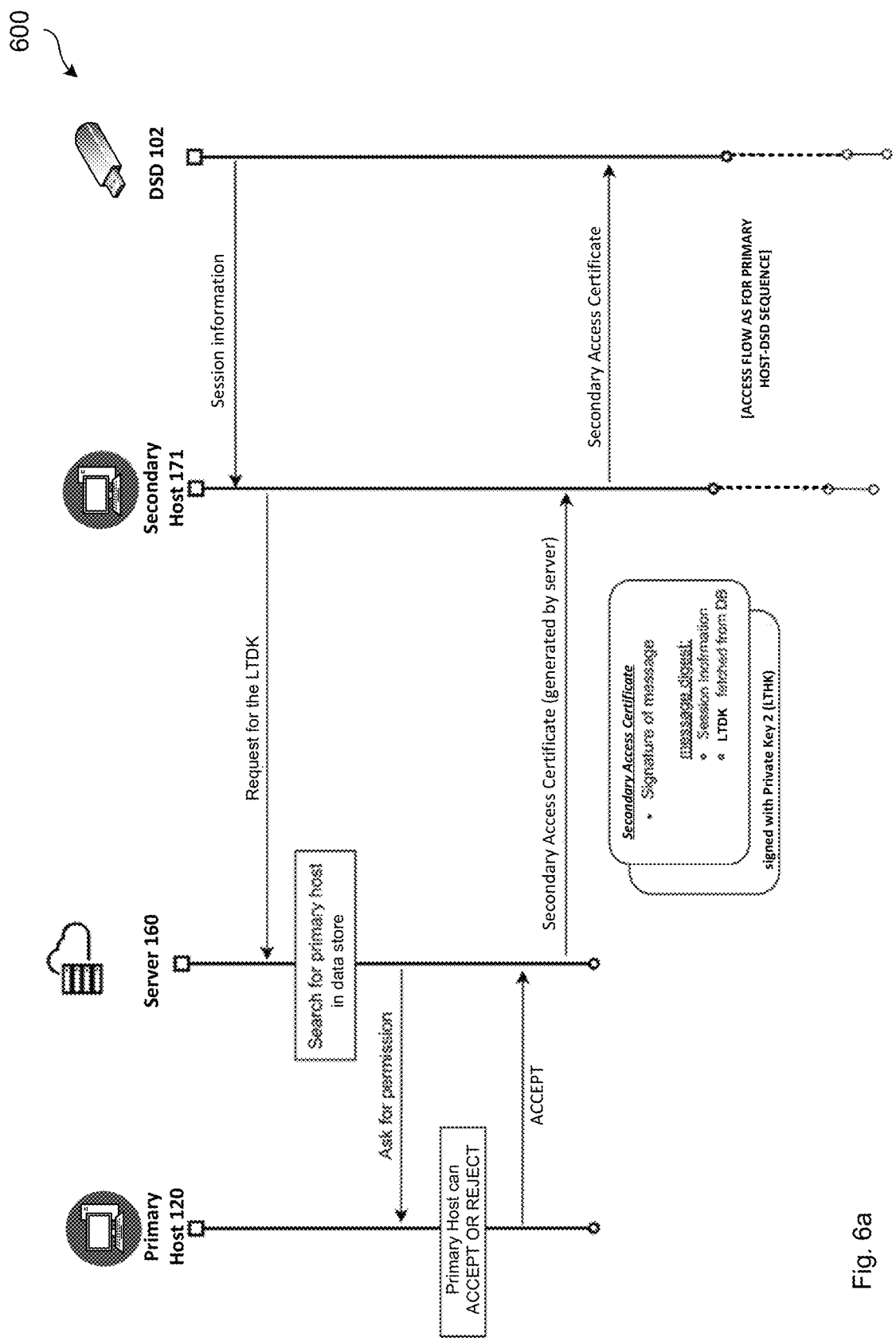
FIG. 6a is a first sequence diagram of a secondary host access sub-process for performing secure data content access by system 100 according to one embodiment.
Figure 6B:
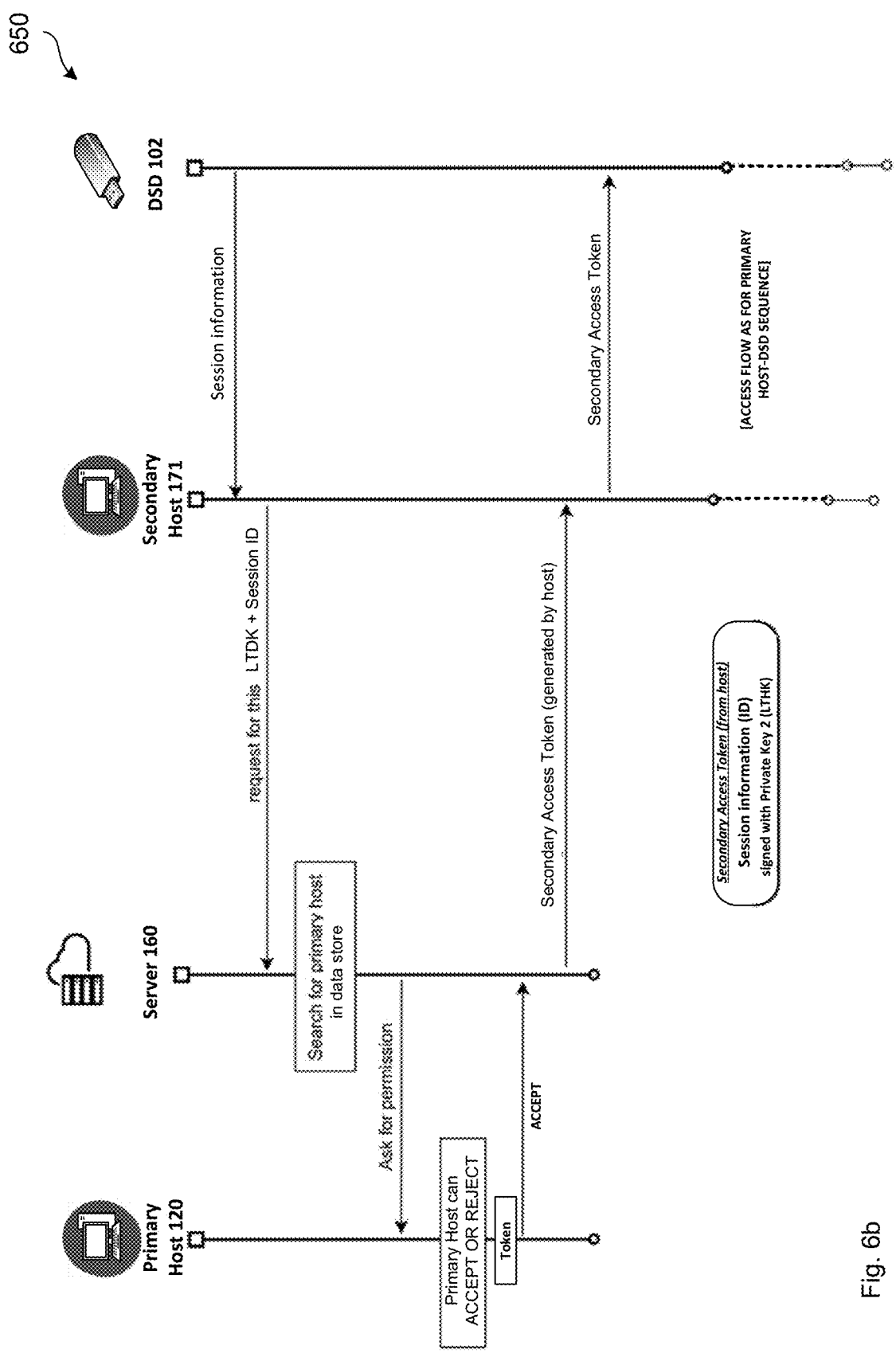
FIG. 6b is a second sequence diagram of a secondary host access sub-process for performing secure data content access by system 100 according to one embodiment.
Figure 7:
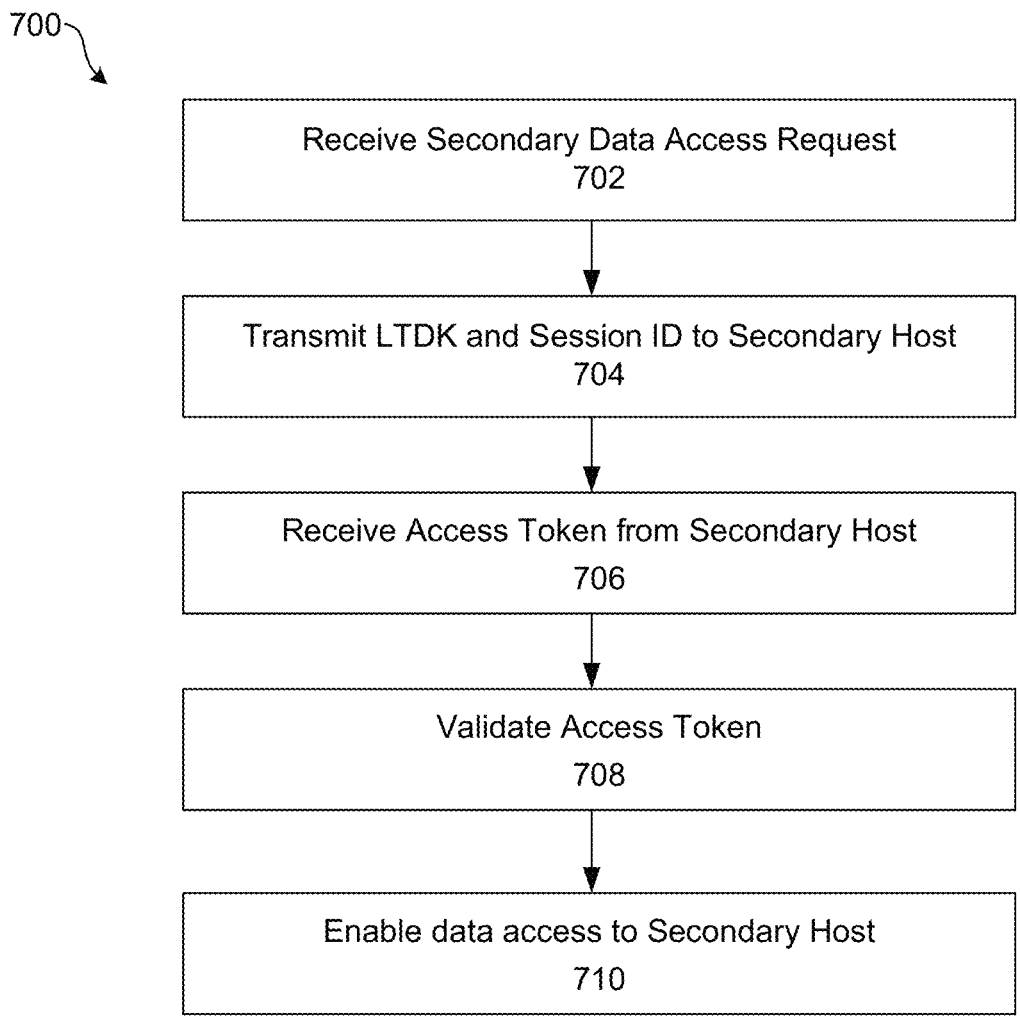
FIG. 7 is a flow diagram of a secondary host access sub-process of the secure data content access process according to one embodiment.

FIGS. 6*a*, 6*b*, and 7 are sequence and flow diagrams respectively of a secondary host access sub-process 700 for performing secure data content access by the system 100. At step 702, the DSD 102 receives a secondary data access request from a secondary host device 171. In the described embodiments, the secondary host device 171 is a mobile computing device of similar type to the primary host 120, and is configured to execute an instance of the SDAHA.

In some embodiments, the secondary data access request is generated and transmitted by the instance of the SDAHA executing on the secondary host device 171. For example, the user of the secondary device 171 may operate interactive interface elements rendered by the UI module to select the DSD 102, and a corresponding "Request data access" option. In some embodiments, the secondary host 171 is configured to automatically generate a data access request on the establishment of a physical connection between the DSD 102 and the host 171 (i.e., in response to the DSD 102 and secondary host 171 connecting through data port 106).

At step 704, in response to receiving the secure connection request, the DSD 102 transmits an acknowledgement to the secondary host 171. In the described embodiments, the acknowledgement includes, at least: the LTDK of the DSD 102; and a second session identifier uniquely generated by the DSD 102 for the data access session of the secondary host 171. The received LTDK value is processed by the SDAHA of the secondary host 171 to determine the registration state of the DSD 102, and specifically whether: i) the DSD 102 is unregistered; ii) the DSD 102 is registered to the secondary host 171 (i.e., confirming its status as a primary host of the DSD); or iii) the DSD 102 is registered to some other host device (i.e., confirming its status as a secondary host of the DSD).

In the described example, a non-null LTDK value indicates to the secondary host 171 that the DSD 102 is registered to a host device (i.e., (i) does not apply). To determine whether the secondary host 171 is actually the (primary) registered host, the SDAHA executing on the host 171 searches its registration data 126 for an LTHK value corresponding to the LTDK of the DSD 102. In the described embodiments, the LTHK is not contained within the registration data 126 since secondary host 171 is not the primary host for the DSD 102 (i.e., since the DSD 102 is actually registered with host 120). In response to failing to find the LTHK in the local memory structure 126, the SDAHA of host 171 transmits an access request to the registration server 160. The access request includes at least the second session identifier uniquely generated by the DSD 102 for the data access session of the secondary host 171. In some embodiments, the access request also includes at least the LTDK of the DSD 102. In other embodiments, the LTDK is passed to the server 160 as a separate request from the SDAHA of the secondary host 171.

The registration server 160 receives the access request and processes the request by: extracting the session identifier of the secondary host 171; and searching the data store 162 for an indication of the registered host device of DSD 102 (based on the LTDK value). The server 160 retrieves the entry with a matching LTDK value to the received LTDK value from the registration table 164, and cross-references the device info table 166 to retrieve the identifier of the registered host device. In the described example, in response to determining that the registered host identifier belongs to host 120, and not to secondary host 171, the registration server 160 generates and transmits a permission request to the primary host 120. In some embodiments, the permission request includes: the identifier data of the secondary host 171, corresponding identifier data of the DSD 102, and other properties describing the access request made by the secondary host 171 to the server 160 (e.g., the time of the request).

The SDAHA 121 executing on the host 120 is configured to receive the permission request, and process the request by providing the user of the host device 120 with means to accept or reject the request. For example, the UI module 122 may be configured to present elements on a display of the host device 120 showing an indication of the secondary host 171 and the DSD 102 (as obtained from the permission request), and one or more interactive elements enabling the user to enter a permission request response to either authorize permission for, or deny permission to, the secondary host 171 to access the user data of the DSD 102.

The permission request response is transmitted by the SDAHA 121 to the registration server 160. In response to the permission request response providing authorization for the secondary host 171 to access the user data of the DSD 102, the registration server 160 transmits a secondary access token to the secondary host 171. As described above, the secondary access token is either: an access certificate generated by the registration server 160 (see FIG. 6a); or a digital signature generated by the host 120 (see FIG. 6b), where the access token includes the second session identifier generated by the DSD 102 for the data access session of the host 171. In either case, the secondary access token is cryptographically secured by the LTHK of the host 120.

The transfer of secondary access token data from the server 160 to the secondary host 171 occurs via a secure HTTPS connection, thereby preventing a MITM attack from compromising the token during the transmission. In some embodiments, the registration server 160 is configured to record secondary access token data in association with the authorization of the secondary host 171 to access the user data of the DSD 102 (e.g., within the registration table 164, or a similar structure).

At steps 706 and 708, the DSD 102 receives the secondary access token from the secondary host 171, and validates the secondary access token to determine the secondary host 171 as authorized to access the DSD 102. As described above, the validation of the secondary access token involves decrypting the a signature value with the LTDK, and subsequently verifying that the token is based on the registration of the trusted host 120 with the DSD 102. At step 710, in response to determining the secondary host 171 as authorized to access the DSD 102, the DSD 102 selectively sets a data access state of the DSD 102 to at least an unlocked state to enable access to the user data 109 by the host 171 via the data port 106 (i.e., described above in step 510).

In the described embodiments, in response to a request to register the DSD 102 with host 120, host 120 receives: a registration token which it may subsequently pass to the DSD 102; and an LTHK value corresponding to the LTDK contained in the registration token. In some embodiments, the LTHK value is persistently stored in the registration data 126 of the host device 120, such that subsequent connections (i.e., after successful registration and provision of the LTHK and LTDK to the host 120 and DSD 102 respectively) between the host 120 and the DSD 102 are formed without receiving data from the server 160. That is, the data access flow (step 304) is not reliant on any communication occurring with the registration server 160. In such embodiments, the primary host is able to generate access tokens to enable access to the user data of the DSD 102 on demand in an ad-hoc manner without further communication from the server 160.

By contrast, the secondary host 171 receives a secondary access in response to an authorization, by the host 120, of the secondary host 171 to access the user data of the DSD 102. The secondary access token is obtained from the server 160 (i.e., via a separate request) for each single data access session between the secondary host 171 and the DSD 102.

In some embodiments, the LTHK and LTDK pair is invalidated in response to one or more invalidation conditions, such as: the expiry of a duration of time since the generation of the key pair by the server 160; a change in hardware detected for either the host 120 or DSD 102; and the total number of distinct data access sessions between the DSD 102 and the host 120 exceeding a predetermined threshold number. In this case, the SDAHA 121 and/or SDAA 101 may be programmed to securely delete the respective LT keys forcing the registration step 302 to be completed before access to user data of the DSD may be securely provided to a host using the above described approaches. In some embodiments, each DSD 102 can be registered with a pre-specified maximum number of host devices 120. That is, in response to a DSD 102 being registered with the pre-specified maximum number of hosts, the registration server 160 is configured to refuse further requests to register the DSD 102 by other host devices.

Time Latency

The systems and methods of the described embodiments provide secure access to the user content data of the DSD 102 and one or more host devices while introducing minimal latency into the connection procedure.

Experimental evaluations were conducted to evaluate the latency introduced into the process of providing secure access to the user data of the DSD 102 to the host 120. The evaluations measured the delay associated with the: generation of the access certificate or digital signature; cryptographic signing of the certificate or signature; and decrypting of the certificate or signature to validate the data access request. Based on a SECP256R1 ECC curve, the extra bytes that need to be transmitted are, on average, around 400 bytes in size. According to transmission rates under USB data transfers, this results in a delay of approximately 0.4 milliseconds.

The experimental evaluation also measured involved an assessment of the delay of microcontroller-based C libraries fir performing public-key encryption operations. The results showed that a processing delay of around 2000-2400 milliseconds is introduced by the execution of an encryption or decryption routine according to ECDSA or ECDH, for the mentioned ECC curve.

The experimental results illustrate that the processing delays introduced by the secure data content access processes described herein are relatively small, such that these delays are likely to have only a minimal effect on the user experience.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each of the appended claims.

The invention claimed is:

1. A method for securing access to a data storage device (DSD), comprising:
   transmitting, to a host, user device information including at least an identification key (IDK) of the DSD, wherein the user device information is provided to a registration server by the host as a request to register the host as authorized to access the DSD;
   in response to the registration server verifying, using the IDK of the DSD, that no host is registered as being authorized to access the DSD, receiving from the registration server, via the host, a signed registration token, wherein the signed registration token includes a Long Term Device Key (LTDK) of the DSD;
   receiving, from the host, a data access request for a data access session to access user data stored on a non-volatile storage medium of the DSD, wherein the host is connected to a data port of the DSD;
   in response to receiving the data access request, transmitting an acknowledgement to the host, wherein the acknowledgement includes:
      the LTDK of the DSD; and
      a session identifier that is uniquely generated by the DSD for the data access session of the host;
   receiving, from the host, an access token signed by a private Long Term Host Key (LTHK) of the host, wherein the LTHK of the host and the LTDK of the DSD form a cryptographic Long Term Key pair;
   validating the access token using the LTDK of the DSD to determine whether the host is authorized to access the DSD; and
   in response to determining that the host is authorized to access the DSD, selectively setting a data access state of the DSD to an unlocked state to enable access to the user data by the host via the data port.

2. The method of claim 1, wherein:
   the signed registration token is cryptographically secured by a registration server key pair associated with the registration server; and
   the registration server key pair includes:
      a private server key used by the registration server to cryptographically sign the registration token; and
      a public server key used by the DSD to verify the received signed registration token.

3. The method of claim 2, wherein the public server key is stored in a non-volatile memory of the DSD prior to the DSD receiving the signed registration token.

4. The method of claim 1, wherein:
   the LTDK and the LTHK are generated by the registration server; and
   the LTHK is transmitted from the registration server to the host.

5. The method of claim 1, wherein the LTDK and the LTHK are generated by the host.

6. The method of claim 1, wherein the access token:
   is generated by the host; and
   includes a representation of the session identifier of the acknowledgement received from the DSD.

7. The method of claim 6, wherein the access token comprises:
an access certificate; and
a digest including:
the representation of the session identifier; and
the LTDK of the acknowledgement received from the DSD.

8. The method of claim 1, wherein, in response to selectively setting the data access state to the unlocked state, the DSD is configured to generate a physical enable signal to enable transmission of user data between the host and the non-volatile storage medium via the data port.

9. The method of claim 1, further comprising:
receiving, from a secondary host, a secondary data access request for a second data access session to access user data stored on the non-volatile storage medium of the DSD, wherein the secondary host is connected to the data port of the DSD;
in response to receiving the secondary data access request, transmitting a secondary acknowledgement to the secondary host, wherein the secondary acknowledgement includes:
the LTDK of the DSD; and
a second session identifier that is uniquely generated by the DSD for the second data access session of the secondary host;
receiving, from the secondary host, a secondary access token signed by the LTHK of the host;
validating the secondary access token to determine that the secondary host is authorized to access the DSD; and
in response to determining that the secondary host is authorized to access the DSD, selectively setting the data access state of the DSD to the unlocked state to enable access to the user data by the secondary host via the data port,
wherein the secondary access token is transmitted to the secondary host by the registration server, in response to the host providing authorization for the secondary host to access the user data of the DSD.

10. The method of claim 9, wherein:
the secondary access token is selected from:
an access certificate generated by the registration server; and
a digital signature generated by the host, the access token including the second session identifier; and
the secondary access token is generated in response to the host providing authorization for the secondary host to access the user data of the DSD.

11. A data storage device (DSD), comprising:
a non-volatile storage medium configured to store user data; and
a processor coupled to the non-volatile storage medium, wherein the processor is configured to:
transmit, to a host, user device information including at least an identification key (IDK) of the DSD, wherein the host is configured to provide the user device information to a registration server as a request to register the host as authorized to access the DSD;
in response to the registration server verifying, using the IDK of the DSD, that no host is registered as being authorized to access the DSD, receive from the registration server, via the host, a signed registration token, wherein the signed registration token includes a Long Term Device Key (LTDK) of the DSD;
receive, from the host, a data access request for a data access session to access user data stored on a non-volatile storage medium of the DSD, wherein the host is connected to a data port of the DSD;
in response to receiving the data access request, transmit an acknowledgement to the host, wherein the acknowledgement includes:
the LTDK of the DSD; and
a session identifier that is uniquely generated by the DSD for the data access session of the host;
receive, from the host, an access token signed by a private Long Term Host Key (LTHK) of the host, wherein the LTHK of the host and the LTDK of the DSD form a cryptographic Long Term Key pair;
validate the access token using the LTDK of the DSD to determine whether the host is authorized to access the DSD; and
in response to determining that the host is authorized to access the DSD, selectively set a data access state of the DSD to an unlocked state to enable access to the user data by the host via the data port.

12. The data storage device of claim 11, wherein:
the signed registration token is cryptographically secured by a registration server key pair associated with the registration server; and
the registration server key pair includes:
a private server key used by the registration server to cryptographically sign the registration token; and
a public server key used by the DSD to verify the received signed registration token.

13. The data storage device of claim 12, further comprising:
a non-volatile memory configured to store the public server key prior to the DSD receiving the signed registration token.

14. The data storage device of claim 11, wherein the registration server is configured to:
generate the LTDK and the LTHK, and
transmit the LTHK to the host.

15. The data storage device of claim 11, wherein the host is configured to generate the LTDK and the LTHK.

16. The data storage device of claim 11, wherein:
the host is configured to generate the access token; and
the access token includes a representation of the session identifier of the acknowledgement received from the DSD.

17. The data storage device of claim 11, wherein, in response to selectively setting the data access state to the unlocked state, the processor is further configured to generate a physical enable signal to enable transmission of user data between the host and the non-volatile storage medium via the data port.

18. The data storage device of claim 11, wherein the processor is further configured to:
receive, from a secondary host, a secondary data access request for a second data access session to access user data stored on the non-volatile storage medium, wherein the secondary host is connected to the data port;
in response to receiving the secondary data access request, transmit a secondary acknowledgement to the secondary host, wherein the secondary acknowledgement includes a second session identifier that is uniquely generated by the DSD for the second data access session of the secondary host;
receive, from the secondary host, a secondary access token signed by the LTHK of the host;
validate the secondary access token to determine that the secondary host is authorized to access the DSD; and in response to determining that the secondary host is authorized to access the DSD, selectively set the data access state of the DSD to the unlocked state to enable access to the user data by the secondary host via the data port, wherein the secondary access token is transmitted to the secondary host by the registration server, in response to the host providing authorization for the secondary host to access the user data of the DSD.

19. A host configured for secure data access with a data storage device (DSD), the host comprising:
   means for receiving user device information including at least an identification key (IDK) of the DSD;
   means for transmitting, to a registration server, a request to register the host as authorized to access the DSD, wherein the request to register includes the IDK of the DSD;
   means for, in response to the registration server verifying, using the IDK of the DSD, that no host is registered as being authorized to access the DSD, receiving from the registration server a signed registration token, wherein the signed registration token includes a Long Term Device Key (LTDK) of the DSD;
   means for transmitting, to the DSD, a secure data access request for a data access session to access user data stored on a non-volatile storage medium of the DSD, wherein the host is connected to a data port of the DSD;
   means for receiving, from the DSD, an acknowledgement including:
      the LTDK of the DSD; and
      a session identifier that is uniquely generated by the DSD for the data access session of the host;
   means for generating an access token signed by a private Long Term Host Key (LTHK) of the host, wherein the LTHK of the host and the LTDK of the DSD form a cryptographic Long Term Key pair; and
   means for transmitting the access token to the DSD to validate the access token using the LTDK of the DSD, wherein, in response to the DSD determining that the host is authorized to access the DSD, the DSD selectively sets a data access state of the DSD to an unlocked state to enable access to the user data by the host via the data port.

20. The host of claim 19, further comprising:
means for transmitting the signed registration token to the DSD; and
means for receiving the corresponding LTHK.

* * * * *